(12) United States Patent
Cieslak et al.

(10) Patent No.: US 9,325,380 B2
(45) Date of Patent: Apr. 26, 2016

(54) METHOD AND APPARATUS FOR DATA TRANSFER VIA NEAR FIELD INTERACTION

(71) Applicant: Nokia Corporation, Espoo (FI)

(72) Inventors: Lars Cieslak, Ulm (DE); Jean-Baptiste Greuet, Ulm (DE); Xiao Xi Shi, Woodland Hills, CA (US)

(73) Assignee: Nokia Technologies Oy, Espoo (FI)

( * ) Notice: Subject to any disclaimer, the term of this patent is extended or adjusted under 35 U.S.C. 154(b) by 340 days.

(21) Appl. No.: 13/729,414

(22) Filed: Dec. 28, 2012

(65) Prior Publication Data

US 2014/0187151 A1    Jul. 3, 2014

(51) Int. Cl.
*H04W 4/00* (2009.01)
*H04B 5/00* (2006.01)

(52) U.S. Cl.
CPC ............ *H04B 5/0031* (2013.01); *H04B 5/0012* (2013.01); *H04B 5/0075* (2013.01)

(58) Field of Classification Search
USPC .............................. 455/41.1, 41.2, 420, 556.1
See application file for complete search history.

(56) References Cited

U.S. PATENT DOCUMENTS

| | | | |
|---|---|---|---|
| 7,418,106 B2 | 8/2008 | Greuet et al. | 381/331 |
| 7,428,990 B1 | 9/2008 | Milford et al. | 235/439 |
| 7,983,614 B2 | 7/2011 | Dunko et al. | 455/41.1 |
| 8,291,091 B2 * | 10/2012 | Naniyat | 709/228 |
| 2005/0190928 A1 | 9/2005 | Noto | 381/77 |
| 2006/0133633 A1 | 6/2006 | Hyvonen et al. | 381/315 |
| 2007/0087686 A1 | 4/2007 | Holm et al. | 455/3.06 |
| 2008/0227393 A1 | 9/2008 | Tang et al. | 455/41.3 |
| 2009/0310790 A1 | 12/2009 | Sinton et al. | 381/2 |
| 2010/0082784 A1 | 4/2010 | Rosenblatt et al. | 709/222 |
| 2011/0059696 A1 | 3/2011 | Rasmussen et al. | 455/41.1 |
| 2011/0273368 A1 | 11/2011 | Hinckley et al. | 345/56 |
| 2011/0304583 A1 | 12/2011 | Kruglick | 345/174 |
| 2012/0106078 A1 * | 5/2012 | Probst et al. | 361/679.56 |
| 2012/0139865 A1 * | 6/2012 | Krah et al. | 345/174 |

FOREIGN PATENT DOCUMENTS

WO    WO-2011/095841 A2    8/2011

OTHER PUBLICATIONS

"Double Twist's latest trick is NFC-based MP3 sharing between Androids", Richard Lawler, May 10, 2011, 4 pgs.
"inStereo—Wireless iPhone, iPad, iPod stereo speaker system", http://instereo.com.au/ , Oct. 7, 2011, 3 pgs.
"Wireless Multi-Room Audio/Sony/Sony Store USA", Oct. 7, 2011, 3 pgs.
Sony Store USA/Sony VAIO®Computer/Sony Consumer Electronics, Jun. 6, 2012, 2 pgs.
"inStereo—Life's better inStereo!", Jun. 6, 2012, 2 pgs.
"Capacitive Power Transfer for Contactless Charging", Mitchell Kline et al., IEEE 2011, pp. 1398-1404.

(Continued)

*Primary Examiner* — Blane J Jackson
(74) *Attorney, Agent, or Firm* — Harrington & Smith

(57) ABSTRACT

In accordance with an example embodiment of the present invention, a method is disclosed. Data is provided at a first section. A second section is detected proximate the first section. The first section is wirelessly coupled with the second section. The data is transferred from the first section to the second section based, at least partially, on the wireless coupling. At least one of the first and the second sections includes a transmitting feature and/or a receiving feature.

17 Claims, 21 Drawing Sheets

(56) References Cited

OTHER PUBLICATIONS

"Capacitive coupling enables data transfer using touch", http://www.eetasia.com/Art_8800670480_480500_NT_1d50623a.HTM; Jul. 10, 2012, 3 pgs.

"Black Samsung Galaxy Tab 8.9 Bluetooth Keyboard Leather Case Holder", Alpha Gadgets, Nov. 14, 2012, 4 pgs.

"Touchscreen", http://en.wikipedia.org/wiki/Touchscreen; Nov. 14, 2012, 10 pgs.

"File: Capacitive touchscreen.jpg", http://en.wikipedia.org/wiki/File:Capacitive_touchscreen.jpg; Nov. 14, 2012, 3 pgs.

* cited by examiner

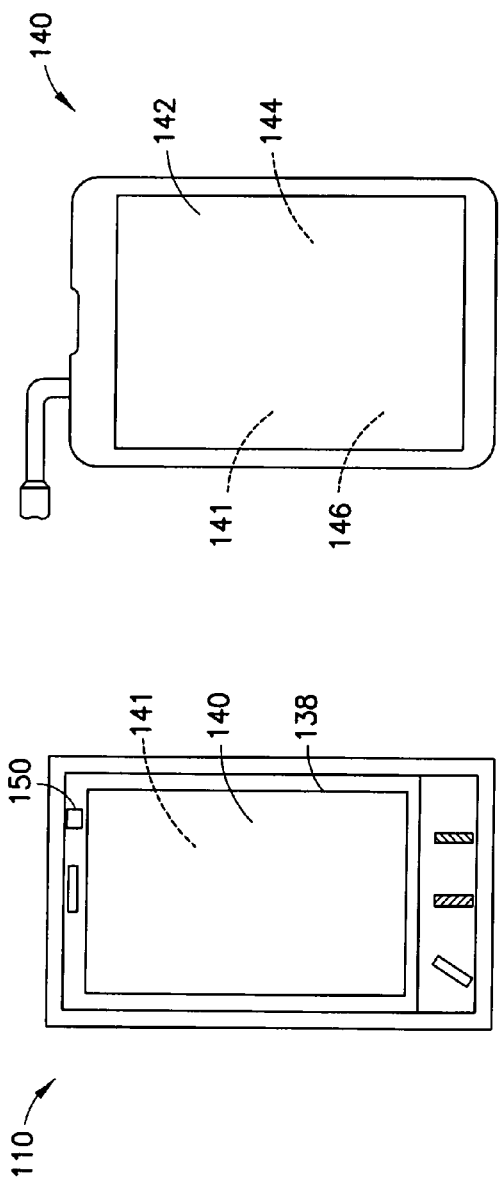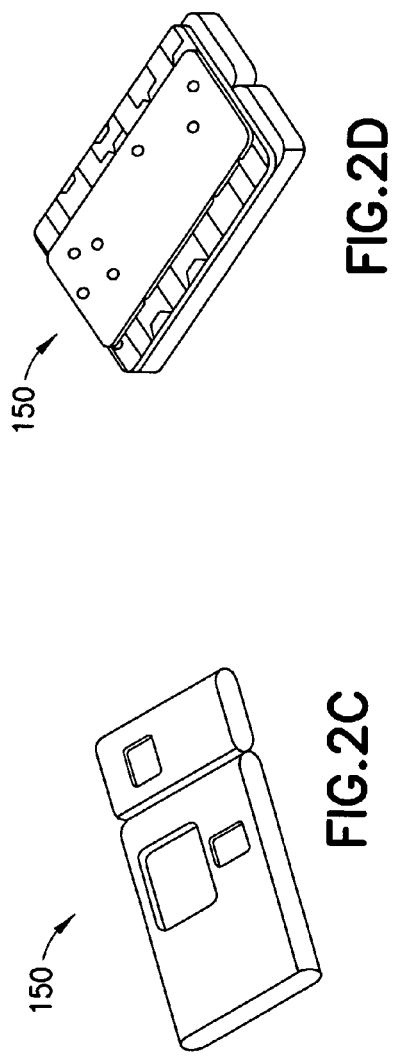

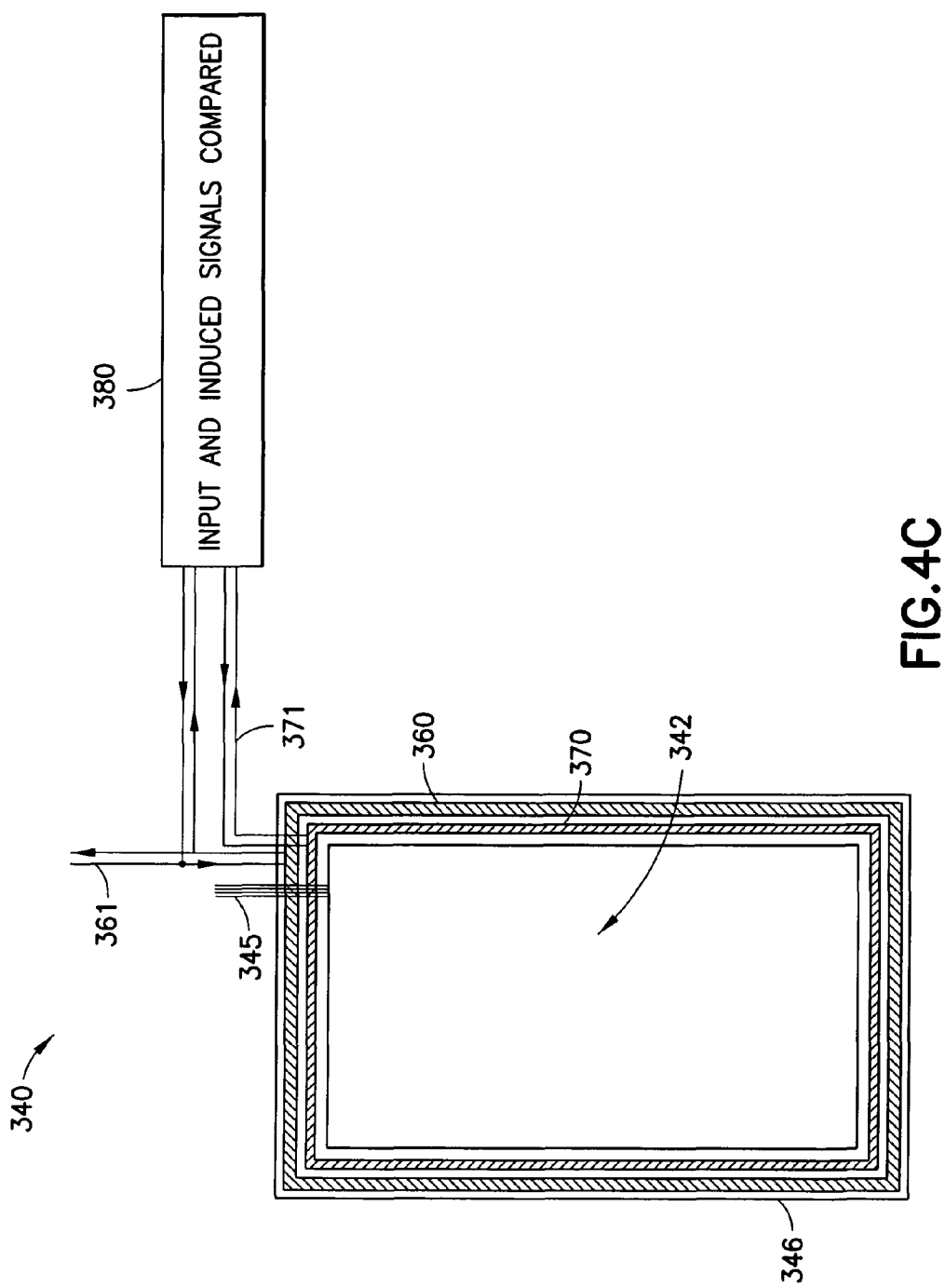

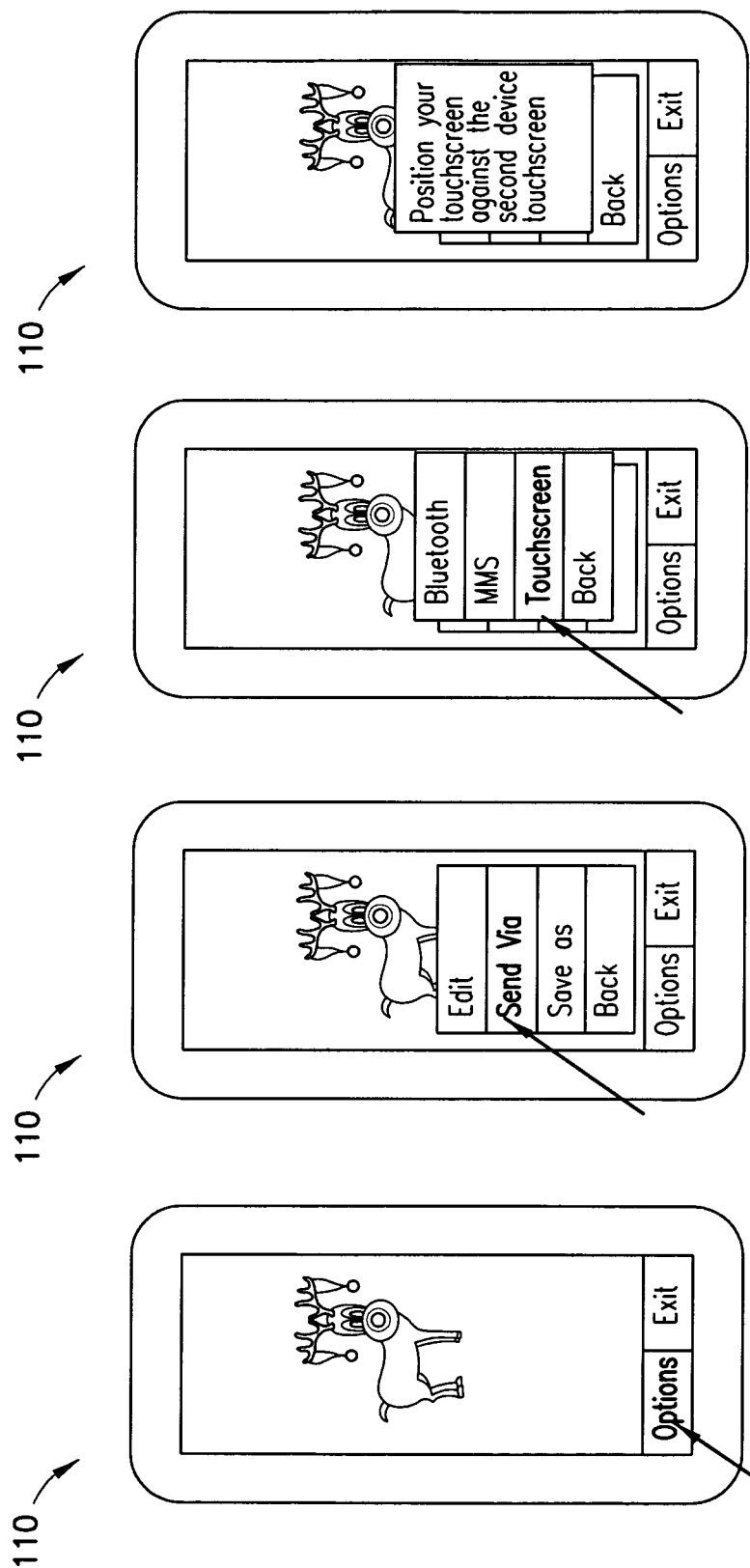

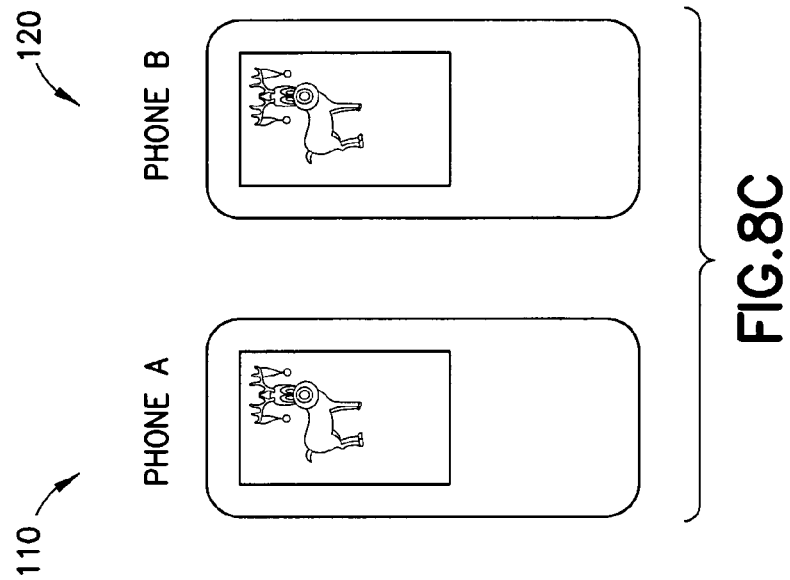
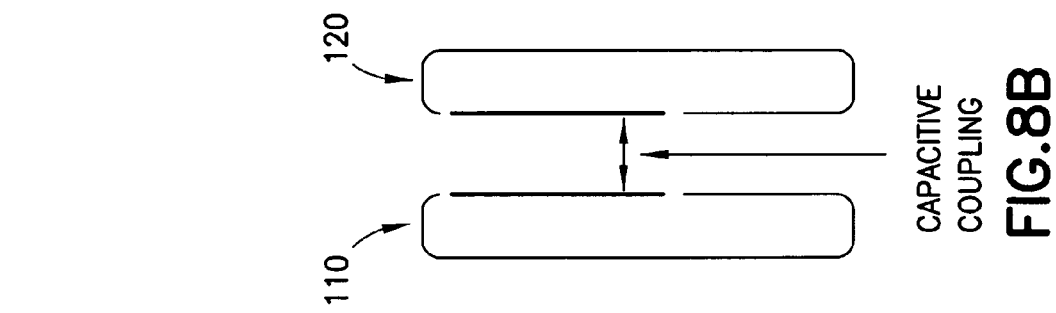
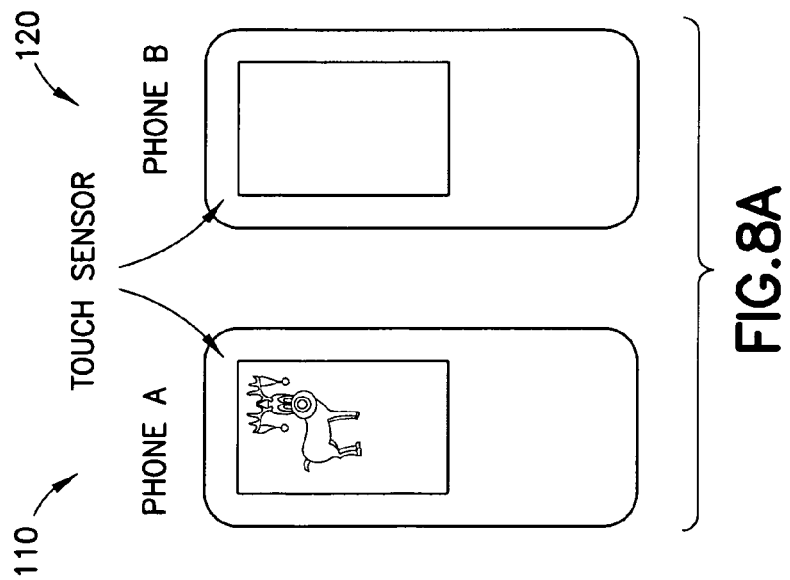

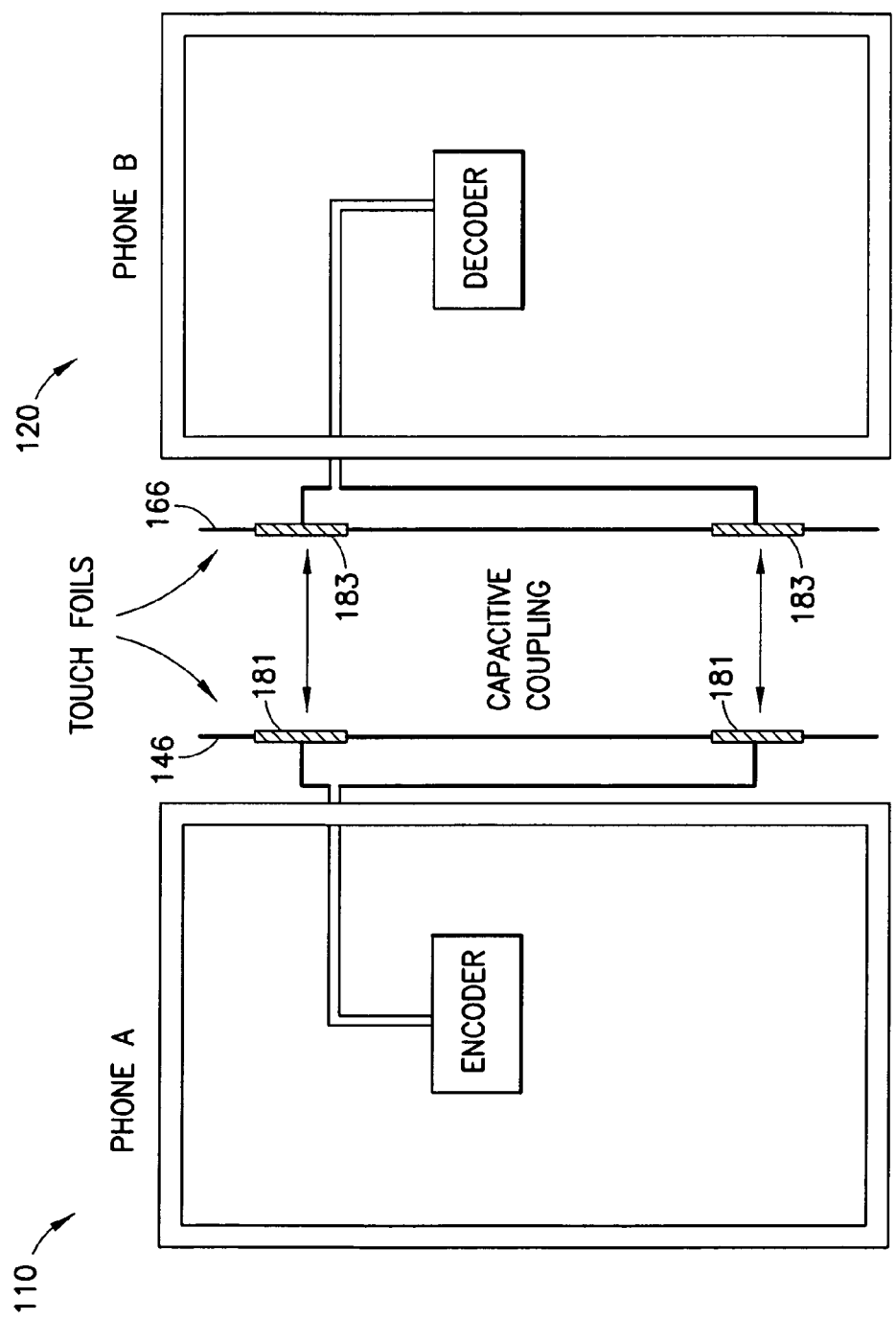

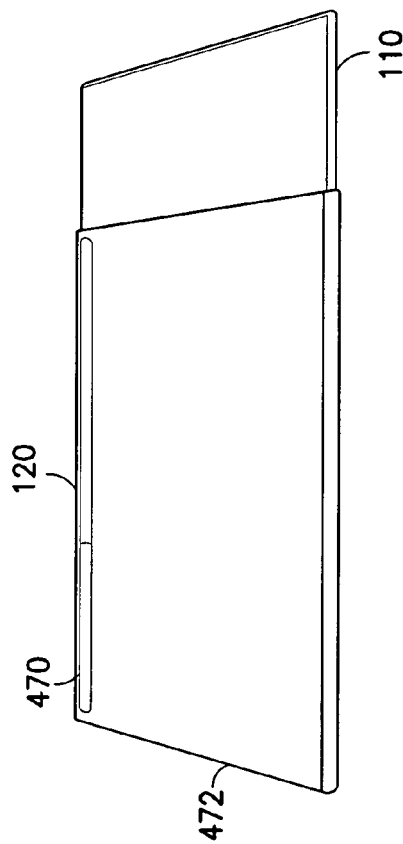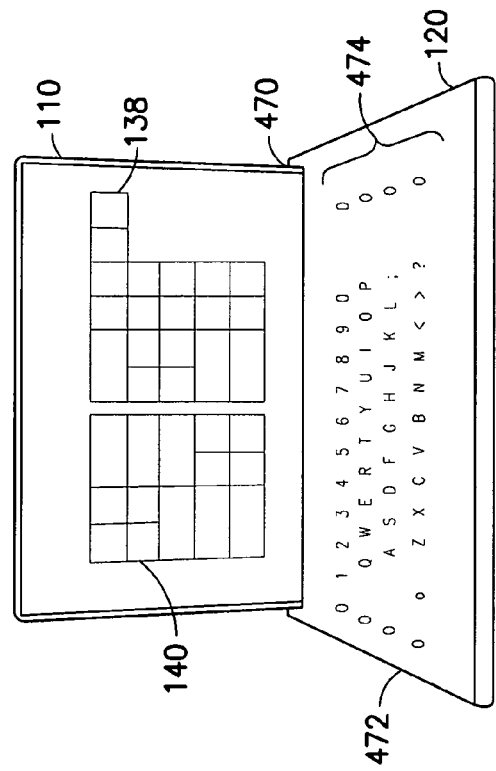

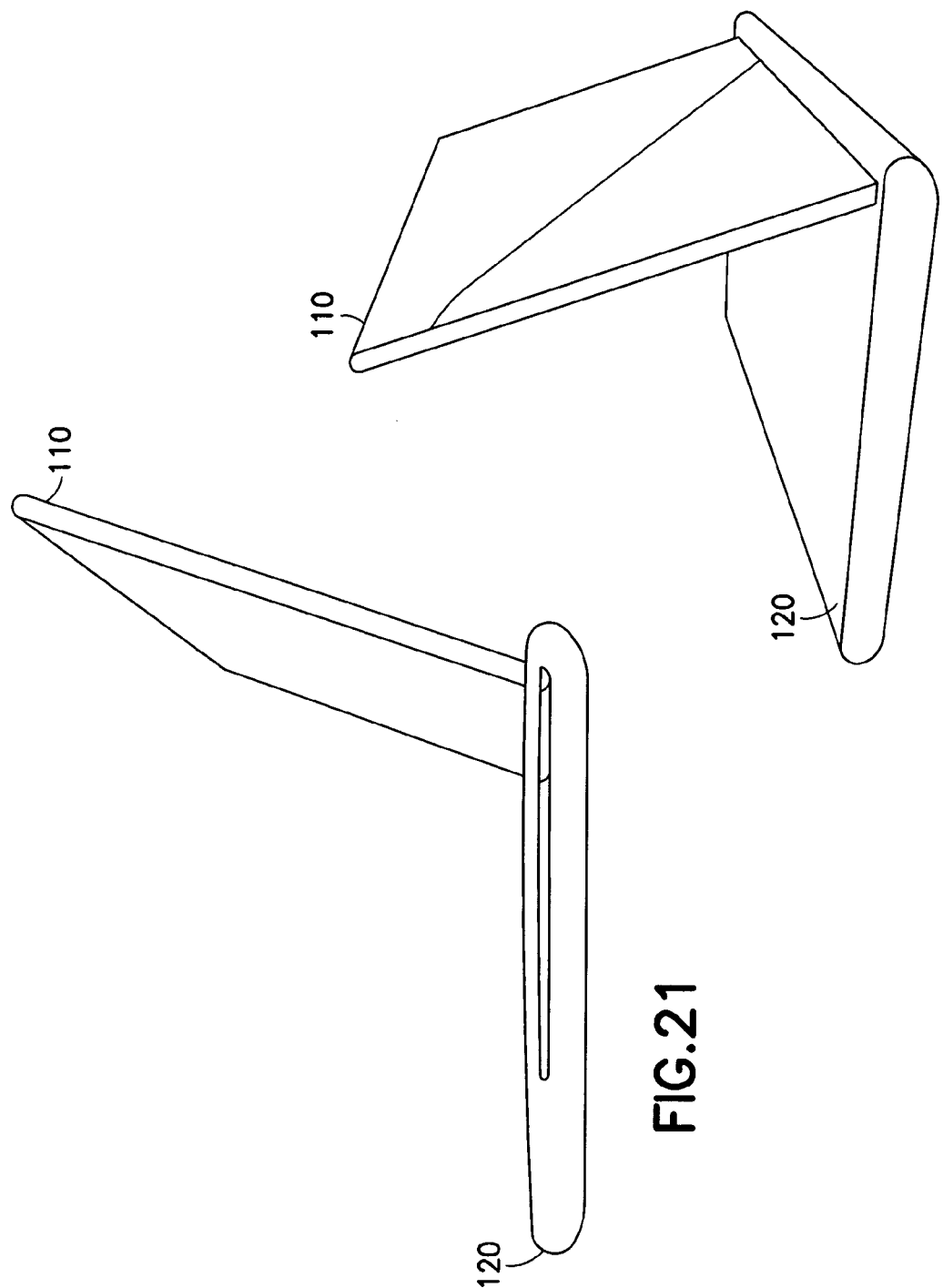

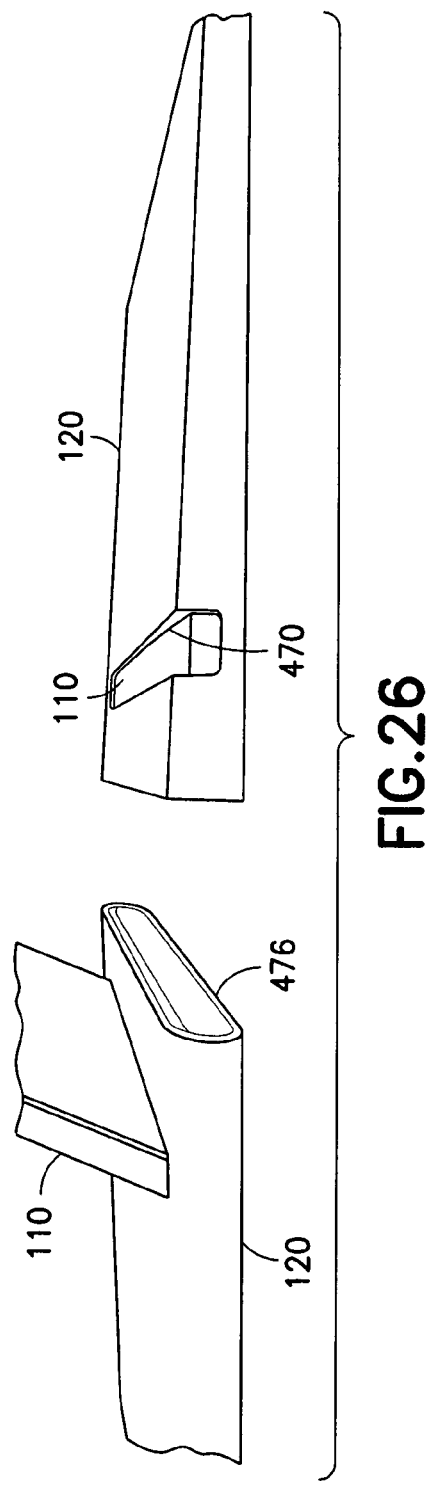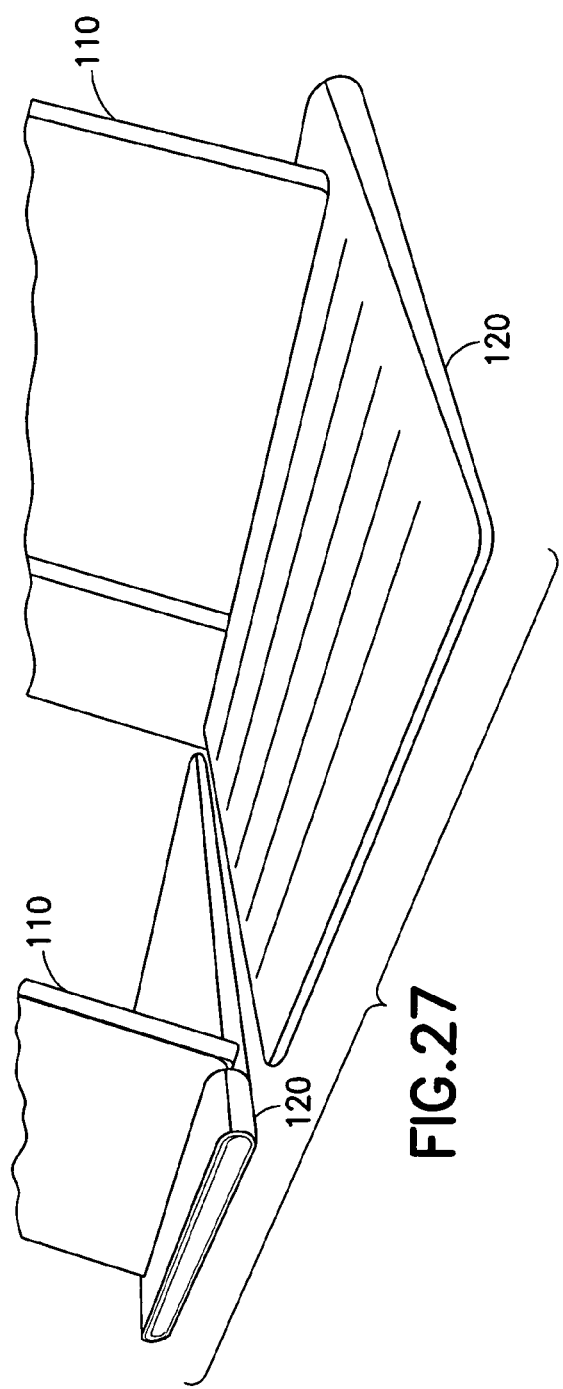

METHOD AND APPARATUS FOR DATA TRANSFER VIA NEAR FIELD INTERACTION

TECHNICAL FIELD

The invention relates to an electronic device and, more particularly, to the transfer of data to an electronic device via near field interaction.

BACKGROUND

Portable devices, such as mobile phones for example, provide various functionalities; through which many use cases may be provided to an end user. The end user is also able to share/transfer files between portable devices (such as a personal computer, a mobile phone, etc.) using well-known solutions such as a Bluetooth (ET) connection, multimedia messaging, a wired connection, swapping memory card, emails, etc.

Various approaches attempt to data transfer characteristics. As consumers demand increased functionality from electronic devices, there is a need to provide improved devices having increased capabilities while maintaining robust and reliable product configurations.

SUMMARY

Various aspects of examples of the invention are set out in the claims.

According to a first aspect of the present invention, a method is disclosed. Data is provided at a first section. A second section is detected proximate the first section. The first section is wirelessly coupled with the second section. The data is transferred from the first section to the second section based, at least partially, on the wireless coupling. At least one of the first and the second sections includes a transmitting feature and/or a receiving feature.

According to a second aspect of the present invention, an apparatus is disclosed. The apparatus includes at least one processor and at least one memory including computer program code. The at least one memory and the computer program code configured to, with the at least one processor, cause the apparatus to perform at least the following: provide data at a first user interface. Detect a second user interface proximate the first user interface. Wirelessly couple the first user interface with the second user interface. Transfer the data from the first user interface to the second user interface, wherein the first user interface includes a transmitting feature and/or a receiving feature.

According to a third aspect of the present invention, a non-transitory program storage device readable by a machine, tangibly embodying a program of instructions executable by the machine for performing operations is disclosed. The program of instructions for performing operations including: providing data at a first user interface. Detecting a second user interface proximate the first user interface. Coupling the first user interface with the touch user interface. Transferring the data from the first user interface to the second user interface, wherein the first user interface includes a transmitting feature and/or a receiving feature.

BRIEF DESCRIPTION OF THE DRAWINGS

For a more complete understanding of example embodiments of the present invention, reference is now made to the following descriptions taken in connection with the accompanying drawings in which:

FIG. 2A shows a drawing of an exemplary device suitable for use in practicing various exemplary embodiments;

FIG. 2B shows an enlarged view of a portion of the device shown in FIG. 2A;

FIGS. 2C-2D show enlarged views of portion of the device shown in FIG. 2A;

FIG. 4C shows an alternate embodiment of the portion shown in FIG. 4B;

FIGS. 5A-5D demonstrates an exemplary pairing procedure for the devices shown in FIG. 1;

FIGS. 8A-8C are various views illustrating an exemplary data transfer between devices in accordance with various exemplary embodiments;

FIG. 9 shows a drawing of exemplary devices with capacitive coupling areas suitable for use in practicing various exemplary embodiments;

FIGS. 15-18 are various views of a tablet and carry case/cover in accordance with various exemplary embodiments;

FIGS. 21-27 show various views of the tablet and carry case/cover in accordance with various exemplary embodiments.

DETAILED DESCRIPTION OF THE DRAWINGS

An example embodiment of the present invention and its potential advantages are understood by referring to FIGS. 1 through 28 of the drawings.

Figure 1:
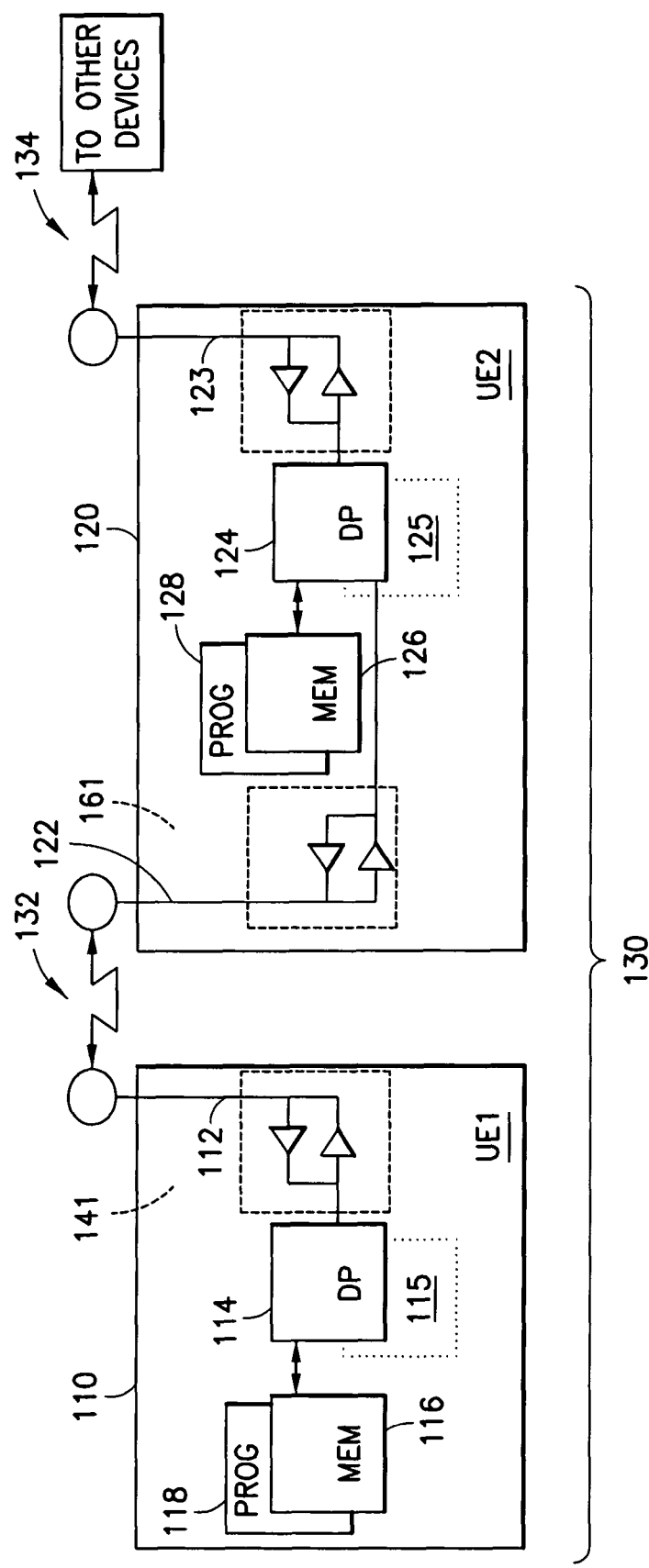
FIG. 1 is a simplified block diagram of exemplary electronic devices that are suitable for use in practicing various exemplary embodiments.
Figure 3:
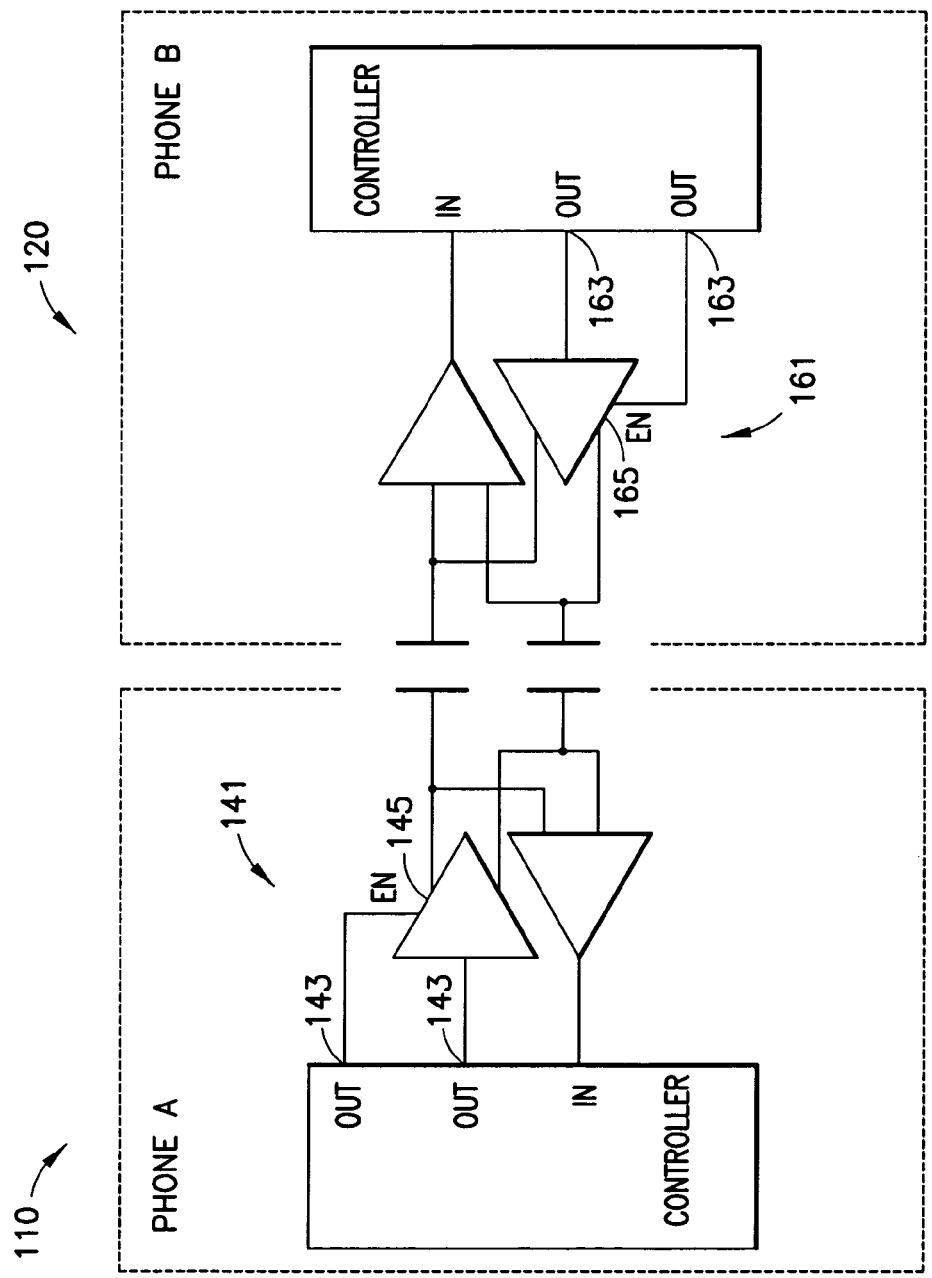
FIG. 3 is a diagram showing portions of the devices shown in FIG. 1.

Reference is made to FIG. 1 for illustrating a simplified block diagram of electronic devices or apparatus that are suitable for use in practicing exemplary embodiments. FIG. 1 shows a first apparatus 110 and a second apparatus 120 connected as paired devices 130. In the paired devices 130 of FIG. 1, the first apparatus, may be referred to as a User Equipment 1 (UE1) 110, and the second apparatus may be referred to as a User Equipment 2 (UE2) 120. In this example, the UE1 110 and UE2 120 may be capacitively coupled to one another as indicated by 132. However, in alternate examples, the UE1 110 and UE2 120 may instead be coupled to one another by any other suitable fashion, such as, inductive coupling, for example.

The UE1 110 includes a controller, such as a computer or a data processor (DP) 114, a computer-readable memory medium embodied as a memory (MEM) 116 that stores a program of computer instructions (PROG) 118, and a wireless interface 112, for wireless communications with the UE2 120 over a wireless link 132. The wireless communication link 132 may be bidirectional.

The UE2 120 also includes a controller, such as a computer or a data processor (DP) 124, a computer-readable memory medium embodied as a memory (MEM) 126 that stores a program of computer instructions (PROG) 128, and a wireless interface 122, for communication with the UE1 110. The UE2 120 may also include a second wireless interface 123, for communication with another device over another wireless link 134.

At least one of the PROGs 118 and 128 is assumed to include program instructions that, when executed by the associated DP, enable the device to operate in accordance with exemplary embodiments, as will be discussed below in greater detail. That is, various exemplary embodiments may be implemented at least in part by computer software executable by the DP 114 of the UE1 110; and/or by the DP 124 of the UE2 120, or by hardware, or by a combination of software and hardware (and firmware). The UE1 110 and the UE2 120 may also include dedicated processors, for example touchscreen processor 115 and touchscreen processor 125. The touchscreen processors are configured to control and/or process signals to and from a display (or display interface) of the device 110, 120. It should be noted that FIG. 1 is illustrates a simplified block diagram according to various exemplary embodiments of the invention. In some embodiments of the invention, the touchscreen may be separate from the display, wherein the display is configured to 'obey' input by the user at the touchscreen. Additionally, various exemplary embodiments of the invention may include separate display hardware and touchscreen hardware, as well as separate display software and touchscreen software. In other alternate embodiments, any suitable configuration for the display hardware, touchscreen hardware, display software, and touchscreen software may be provided. As will be described further below, according to various exemplary embodiments of the invention, both devices have a touchscreen module proximate a top portion of the display (or display interface), wherein the touch module of the devices each have an additional transmitting feature when compared to conventional touch modules which generally only comprise a 'receiver' configuration.

In general, the various embodiments of the UE1 110 and/or the UE2 120 can include, but are not limited to, cellular telephones, tablets having wireless communication capabilities, tablet carrying cases having wireless communication capabilities, device carrying cases having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 116 and 126 may be of any type suitable to the local technical environment and may be implemented using any suitable data storage technology, such as semiconductor based memory devices, flash memory, magnetic memory devices and systems, optical memory devices and systems, fixed memory and removable memory. The DPs 114 and 124 may be of any type suitable to the local technical environment, and may include one or more of general purpose computers, special purpose computers, microprocessors, digital signal processors (DSPs) and processors based on a multicore processor architecture, as non-limiting examples.

The example embodiment of FIG. 1 provides a new wireless interface in a mobile device. The wireless interfaces (for example, interfaces 112 and 122) may be configured for capacitive coupling, or inductive coupling, between the devices 110, 120 to provide for the transfer of data between the devices 110, 120 via capacitive, inductive, or resistive coupling.

For example, according to one example of the invention, FIG. 2A shows a front view of the exemplary mobile device 110 configured to provide for capacitive coupling. As shown in this example embodiment, the device includes a touchscreen module 140 proximate a top portion of the display 138 (such as proximate a front exterior face of the device). According to various exemplary embodiments of the invention, the touchscreen module 140 comprises a transmitting feature 141 (see also FIG. 3). In particular, the touchscreen module 140 (shown in an enlarged view in FIG. 2B) includes a touch screen panel 142 (and a touchscreen foil 146) proximate the front exterior face of the device 110. The touch screen module 140 comprises a touch sensor 144 which determines a location of a touch on the touch screen panel 142. In addition, the device 110 may further comprise a proximity sensor 150 (shown in enlarged views in FIGS. 2C, 2D) adjacent the touch screen module 140. It should be noted that although the touch screen module and the sensor are described as being located at the front exterior face of the device 110, in alternate embodiments, the touch screen module and the sensor may be provided at any suitable location. According to various exemplary embodiments, the transmitting feature 141, 161 may include the output pins 143, 163, and the driver 145, 165 (see FIG. 3). According to various exemplary embodiments, the feature 141, 161 generally provides for one more driver when compared to conventional touchscreen modules. Furthermore, in alternate embodiments the transmitting feature 141, 161 may include any suitable type of transmitting feature(s). According to some example embodiments, the transceiver may be configured for capacitive data transfer such that both UE1 and UE2 can transfer and receive data. However, in alternate embodiments, any suitable type of capacitive data transfer may be provided.

Figure 4A:
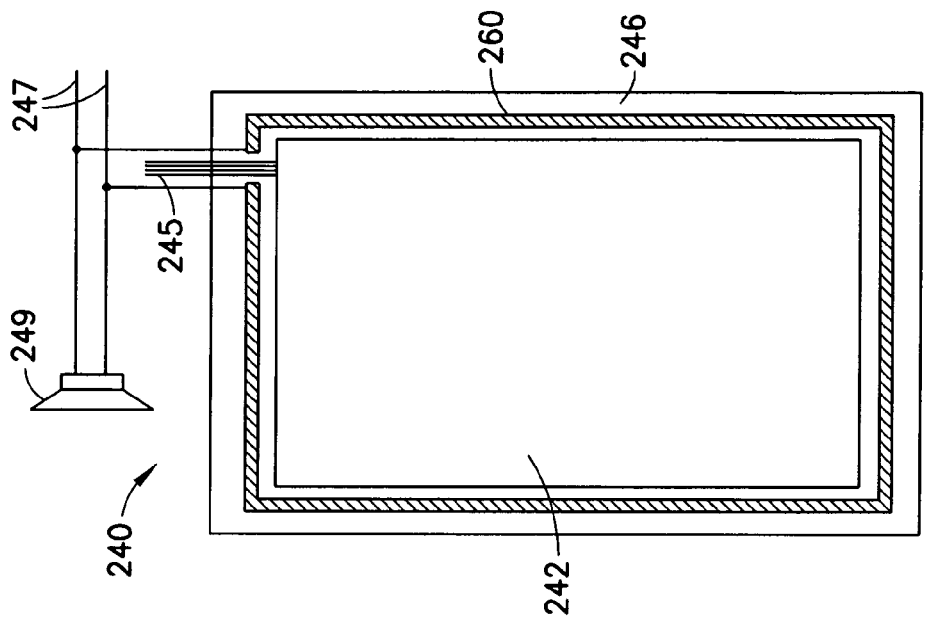
FIG. 4A shows a drawing of an exemplary device suitable for use in practicing various exemplary embodiments.

For example, according to another example of the invention, FIG. 4A shows a front view of an exemplary mobile device 210 configured to provide for inductive coupling. As shown in this example embodiment, the device includes a touchscreen module 240 proximate a top portion of the display 238 (such as proximate a front exterior face of the device). According to various exemplary embodiments of the invention, the touchscreen module 240 comprises a transmitting feature similar to the feature in the device 110. In particular, the touchscreen module 240 (shown in an enlarged view in FIG. 4B) comprises a printed signal line (or coil) 260 on the touchscreen foil 246 for generating magnetic field strength for inductive coupling proximate the front exterior face of the device 210. In addition, the device 210 may further comprise a proximity sensor 250 (similar to the proximity sensor 150) adjacent the touch screen module 240. It should be noted that although the touch screen module 240 is described as being located at the front exterior face of the device 210, in alternate embodiments, the touch screen module 240 may be provided at any suitable location. According to various exemplary embodiments, the transmitting feature may include any suitable type of transmitting feature, wherein the transceiver (similar to the transceiver of FIG. 3) may be configured for inductive data transfer such that both UE1 and UE2 can transfer and receive data, such as by both UE1 and UE2 being equipped with the coil 260, for example. However, in alternate embodiments, any suitable type of inductive data transfer may be provided.

Figure 4B:
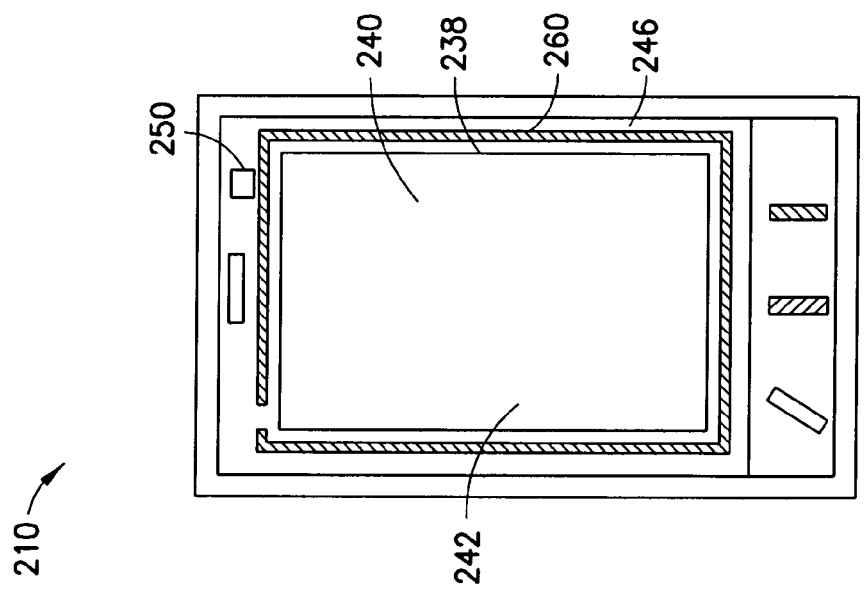
FIG. 4B shows an enlarged view of a portion of the device shown in FIG. 4A.
Figure 6:
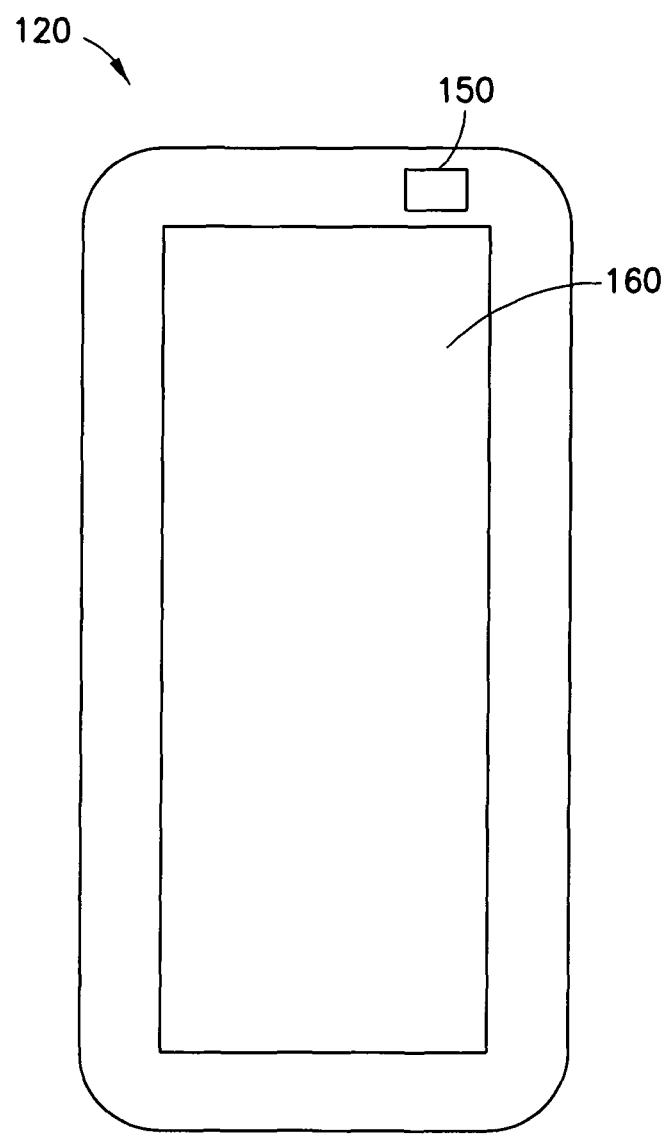
FIG. 6 shows a drawing of an exemplary device suitable for use in practicing various exemplary embodiments.

In terms of inductive coupling, the signal line 260 (which may be printed on the touch sensitive conductive foil 246, for example) forms a loop which creates a magnetic field that is detected by the second device UE2 (also equipped with a detection coil). According to some embodiments of the invention, the printed coil 260 may be located in an area around a touch panel 242 (and a portion of the touch sensor signals 245). The printed coil 260 (or signal loop) in not required to be circular and may take additional shapes, for example, rectangular as shown. In some embodiments, the same signal line 260 could be connected to the downlink audio signal for the hearing aid compatibility. For example, as shown in FIG. 4B, the printed coil 260 comprises the signal loop used by the hearing aid device and is connected to the audio signals 247 of the earpiece 249 (which may be suitably disposed to be in communication with the earpiece opening of the device 210). Additionally, it should be understood that there may be more than one loop to increase the magnetic field.

According to some exemplary embodiments of the invention, and referring now also to FIG. 4C, the touchscreen module 340 may include two coils printed on the touchscreen panel 342. The touchscreen module 340 is similar to the touchscreen module 240, however in this embodiment the touchscreen module 340 further includes a reception coil 370 in addition to the signal coil 360. Similar to the touchscreen module 240, the reception coil 370 and the signal coil 360 (which may be printed on the touch sensitive conductive foil 346, for example) each form a loop which creates a magnetic field that is detected by the second device UE2 (also equipped with reception and signal coils). According to some embodiments of the invention, the coils 360, 370 may be located in an area around the touch panel 342 (and a portion of the touch sensor signals 345). The printed coils 360, 370 are not required to be circular and may take additional shapes, for example, rectangular as shown. As shown in FIG. 4C, the configuration of the touchscreen module 340 allows for the input signal 361 of the signal coil 360 and the induced signal 371 of the reception coil 370 to be compared (see block 380).

While various exemplary embodiments of the invention have been described above in connection with the signal line as being printed on the touch sensitive conductive foil, one skilled in the art will appreciate that the various exemplary embodiments are not necessarily so limited and that the printed coil may be, for example, on a circuit board or printed to the inside of the cover of the device.

It should further be noted that the inductive coils may be of any type suitable to the local technical environment and may be implemented using any suitable communication technology such as a hearing aid compatibility (HAC) coil, a coil of a near field communications (NFC) antenna, a metal detector coil, a coil of an internal speaker, or any other suitable type coil.

It should also be noted that although some embodiments of the invention have been described in connection with devices configured to be capacitively coupled or inductively coupled, some other exemplary embodiments may be configured to be wirelessly coupled in any other suitable fashion.

It should be noted that although various examples below are described in the context of capacitive coupling, it should be apparent that the use of the embodiments discussed below are not limited to only these particular capacitive coupling embodiments but also apply to inductive coupling (as in device 210, for example). However, for the purposes of clarity, the description below is made mainly in reference to capacitive coupling. Additionally, any references made to similar features, apply equally to the other similar features.

According to various exemplary embodiments, the transfer of data between mobile devices can be provided via touch capacitive coupling. For example, when the two mobile devices are placed near each other such that the mobile devices' touch sensors are placed close to each other, then the data from UE1 is sent to UE2, based on the coupling via capacitance to the touch module of UE2 (or inductive coupling between the two mobile devices), then UE2 decodes the data.

It should be noted that the data transfer can also be understood as data sharing. In addition, any kind of data can be shared, for example, sound files, recordings, ringtones, as well as images, videos and contact cards. According to various examples of the invention, a very practical user case is to transfer a picture that can be seen on one device display onto the device display of another device, just via near field communication based on the touch sensors of the devices. For example, instant music transfer can be performed via touch provided that the music data modulated at high frequency in device 110, demodulated in device 120. This modulation is generally provided to overcome the high impedance of the capacitor formed by the two touch modules of the devices 110, 120. According to some embodiments of the invention, the capacitive data transfer may be configured such that only specific products, such as Nokia products for example, can provide such communication.

According to various non-limiting examples of the invention, phone 110 and phone 120 are paired. Phone 110 acts as a master and phone 120 is the slave. However, in alternate embodiments, any suitable arrangement of the devices may be provided. For example, if a user of phone 120 likes the picture displayed on phone 110, then a software user interface menu (which may a "Touchscreen" transfer user interface, for example) may be activated as shown in FIGS. 5A-5D. FIG. 5A illustrates the phone 110 displaying an image to be transferred to the phone 120, where a user of the phone 110 can select 'options' on the display. FIG. 5B illustrates the phone 110 where the user of the phone 110 can then make a further selection from the expanded 'options' menu. FIG. 5C illustrates the phone 110 displaying the menu options available after the 'Send Via' button was selected. FIG. 5D illustrates the phone 110 displaying instructions to the user of the phone 110 after the 'Touchscreen' button was selected. In this example embodiment, the instructions indicate to position the touch screen against the second device touchscreen. It should be noted that the various menu options shown in FIGS. 5A-5D are provided as non-limiting examples, and any suitable user interface menu options for initiating data transfer via a touch module may be provided.

Exemplary embodiments of the invention provide for the capacitive transfer of data via the touch modules of phones 110, 120. As described above, once the phone touchscreens are proximate each other, the phone 110 touch module can send data to the touch sensitive area of phone 110. Phone 120 can then receive the data sent via phone 110 when it is close enough to phone 110. In some embodiments of the invention, the phone 110 interacts with phone 120 via the "always on" proximity sensors 150 (see FIG. 6).

Interaction between the devices 110, 120 can take multiple forms, such as phone 110 covering the proximity detector of phone 120, or phone 110 vibrations (from its vibra [or vibration module]) being "sensed" by the touchscreen of phone 120, for example. Some other embodiments of the invention may provide for the possibility to use a "double tap" (or a predetermined easy vibration "event") on both phones to 'wake up' the touchscreen transfer. However, it should be noted that these are provided as non-limiting examples, and is some other alternate embodiments, the data can be also transferred based on: a user input (such as, by means of a key press, touch detection, menu selection from the UI, or, voice detection, for example), one or more sensor data where the sensor could be any other sensor, such as a force sensor, a hall effect sensor (such as a hall effect sensor for specific examples where the relative position of the cover against the tablet is sensed), and/or a light sensor (such as similar to the proximity sensor, for example).

Figure 7:
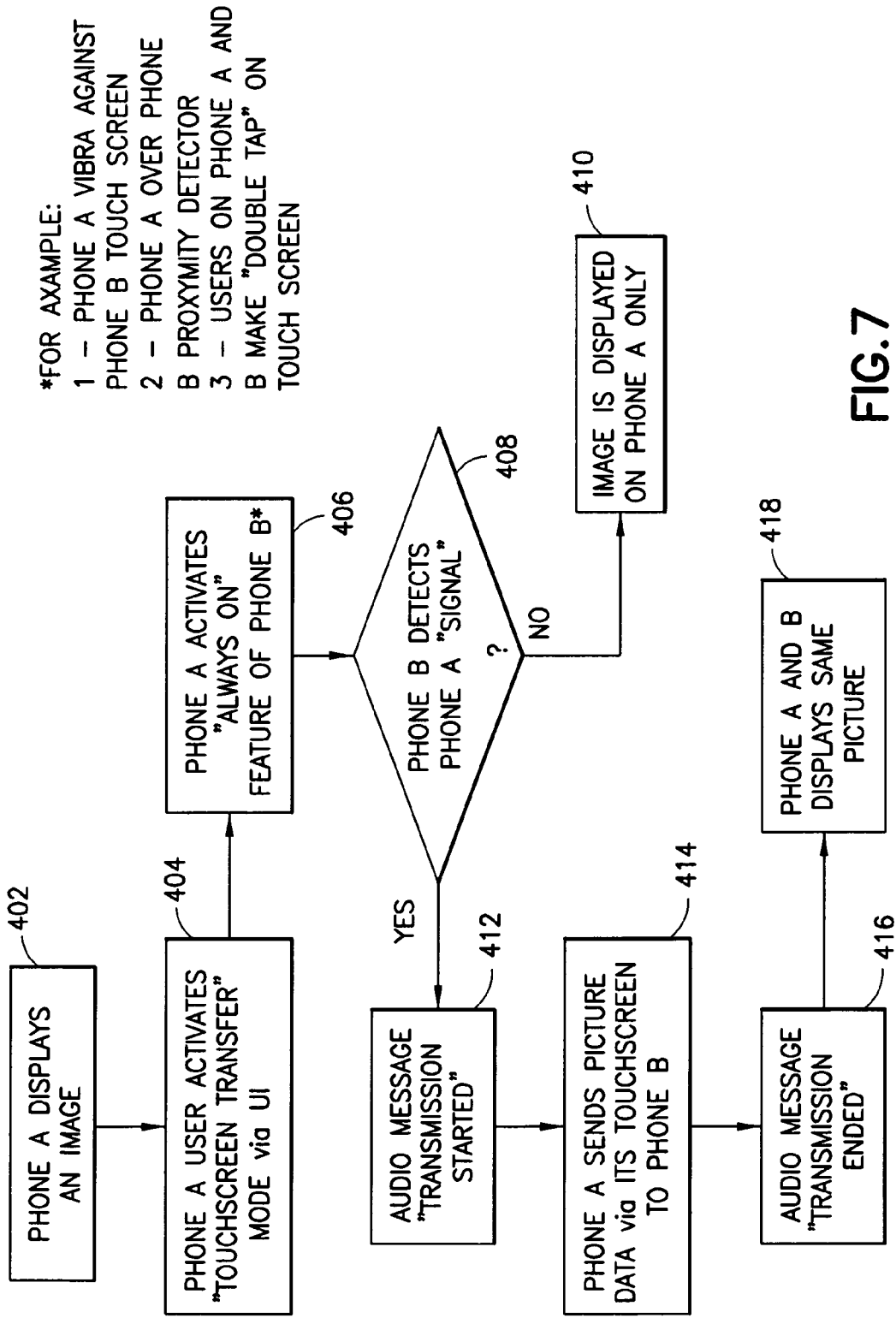
FIG. 7 is a block diagram illustrating an exemplary method in accordance with various exemplary embodiments.

Referring now also to the exemplary method of FIG. 7 and the device views of FIGS. 8A-8C, an example data transfer where an image file is transferred from one device to another is illustrated. As shown in FIG. 8A, before the devices are paired (or capacitively coupled) the device 110 (phone A) displays an image (at block 402). The user of device 110 (phone A) activates a 'touchscreen transfer' mode via the user interface of device 110 (at block 404). Device 110 (phone A) activates an 'always on' feature of the device 120 (phone B), which may include the device 110 vibration module against the touchscreen of the device 120, or the device 110 over the proximity sensor of the device 120, or the users of the devices 110, 120 'double tap' on the touch screens of the devices 110, 120 (at block 406). Once the devices 110, 120 are substantially proximate each other, then the device 120 (phone B) may begin to search or detect the 'signal' from the device 110 (phone A) (at block 408). If the device 120 (phone B) does not detect the 'signal' from the device 110 (phone A), then the image is displayed on the device 110 only (at block 410). If the device 120 (phone B) detects the 'signal' from the device 110 (phone A), then capacitive coupling is provided between the devices in a 'paired' configuration (see FIG. 8B) and an audio message indicating "transmission started" may be provided (at block 412). As such, the devices 110, 120 are capacitive coupled and the device 110 sends picture/image data via its touchscreen to the device 120 (at block 414). When the transmission of the picture data is complete, an audio message indicating "transmission ended" may be provided (at block 416). Now the devices 110, 120 may be separated and the devices 110, 120 display the same image (at block 418, see FIG. 8C). It should be understood that although various exemplary embodiments of the invention have been described in connection with an audio message or an audio signal indicating the staring and/or ending of the data transmission, alternate embodiments may provide any suitable type of audio signal, or other types of signals such as a visual signal, or a tactile feedback signal, for example.

According to some embodiments of the invention, another possibility to enable the touchscreen transfer mode is to use a suitable handshake easy paring protocol, such as the device 120 sending a "Connecting signal" or "Test signal", and the device 110 sniffing this specific "Connecting signal" or "Test signal". For example, if the user of the device 110 does wish to transfer data by capacitively coupling with the device 120, the device 110 may check for a "Test signal". If the device 110 does not detect a "Test signal" (for example, if devices 110 and 120 are too far apart, or device 120 has not be set-up for a touchscreen [capacitive] transfer mode), the data is maintained by device 110 only (for example with no transfer of data). On device 120, the user of device 120 can activate "touchscreen mode" using a user interface on device 120. If a "Test signal" is sent from device 120 and is received by the device 110, device 110 then sends information to device 120 using the touchscreen (capacitive coupling) transfer mode. It should be noted that the above described example provides for device 110 and device 120 to perform a handshake when pairing (for example, in response to device 110 detecting the "Test signal"), where the handshake enables device 110 and device 120 to convey information (e.g., identifiers, configuration settings, etc.) as well as to determine various parameters. However, in alternate embodiments, any suitable type of pairing protocol may be provided.

Figure 10:
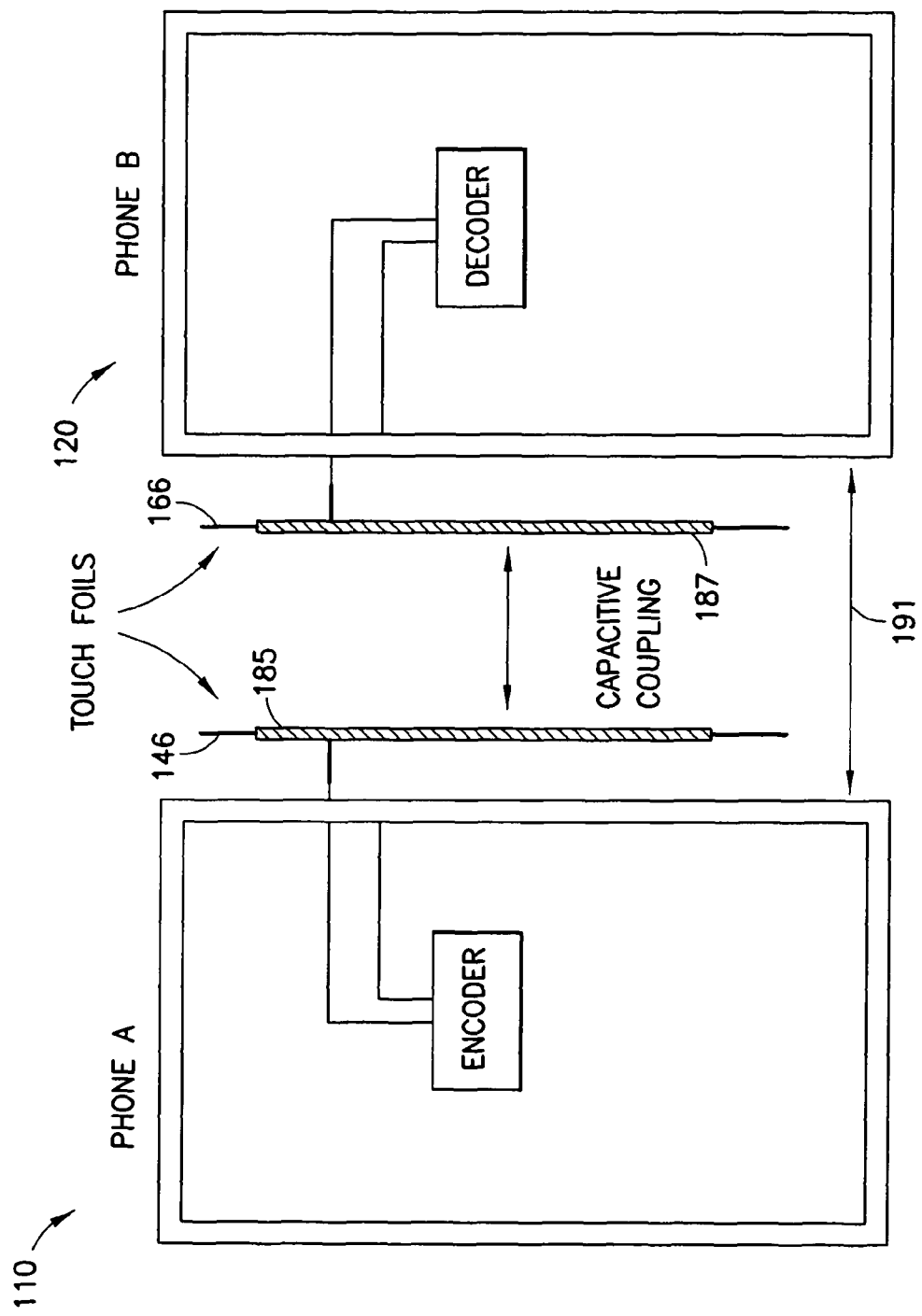
FIG. 10 shows a drawing of exemplary devices with capacitive coupling areas and device ground suitable for use in practicing various exemplary embodiments.
Figure 11:
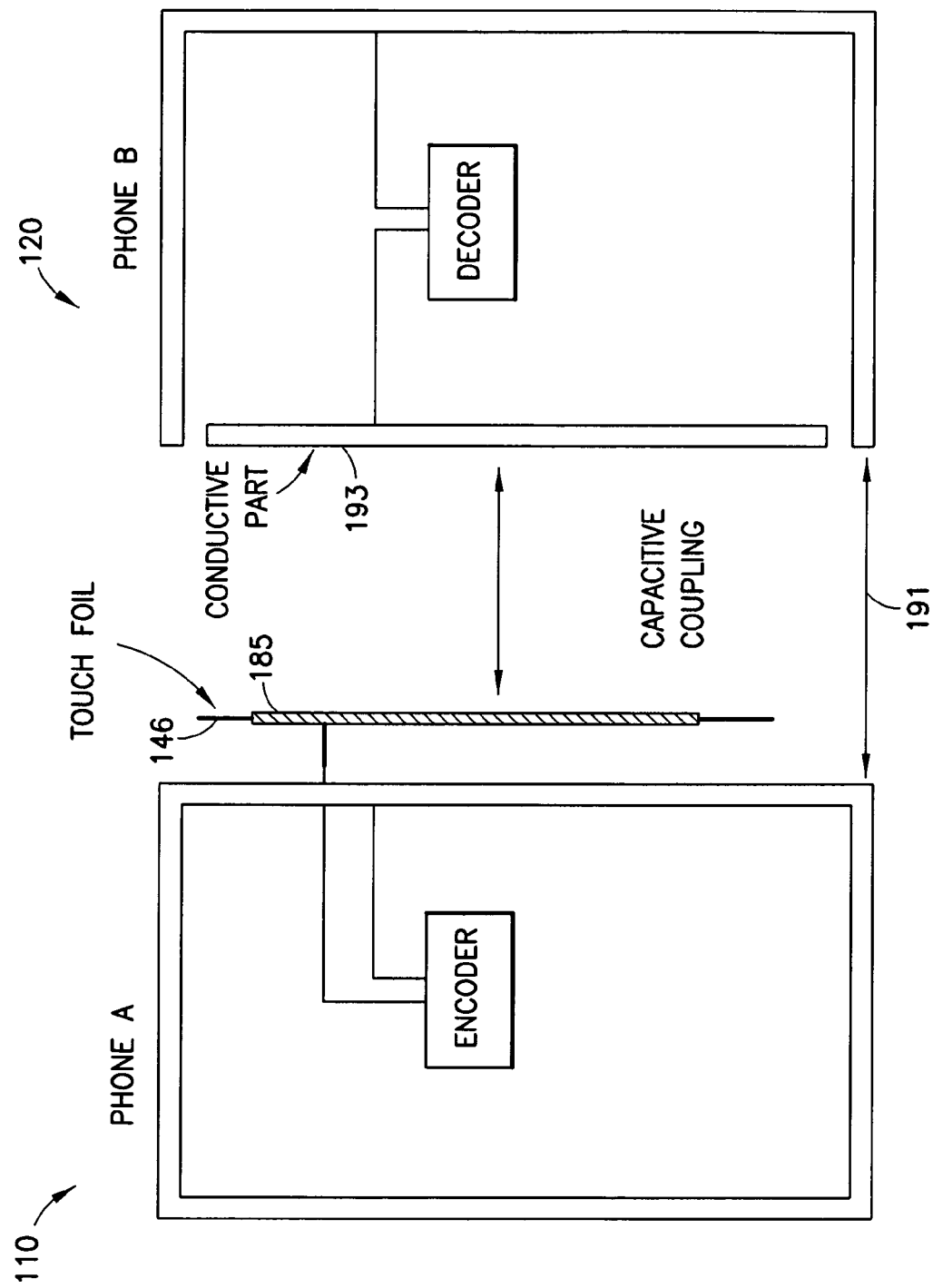
FIG. 11 shows a drawing of exemplary devices with a capacitive coupling area and a conductive part suitable for use in practicing various exemplary embodiments.

According to various exemplary embodiments, the way the data is transferred between the devices 110, 120 can be made in several ways. Referring now also to FIG. 9, the two devices 110, 120 are shown where two dedicated areas of the touchscreen are used between the two devices 110, 120. For example, in this embodiment the areas of the touchscreen represented by cross-hatching 181, 183 are the areas configured for capacitive coupling. However, any suitable locations on the touchscreen may be configured for capacitive coupling. For example, and referring now also to FIG. 10, there is shown a diagram of the two devices 110, 120 where the full touch area 185, 187 (configured for capacitive coupling similar to areas 181, 183) and device ground 191 are used to transfer data between the two devices. For example, in this embodiment the areas of the touchscreen represented by cross-hatching 185, 187 are the areas configured for capacitive coupling. It should be understood that the example embodiments shown in FIGS. 9 and 10 are provided as non-limiting examples, and that in alternate embodiments any suitable number of dedicated areas for capacitive coupling may be provided. For example, in some embodiments of the invention, the device may include more than two areas configured for capacitive coupling, which may provide for faster transfer speeds.

In some embodiments of the invention, the receiver (phone B) side can be a part of the cover (electrically conductive) of phone B, not the touch module. It could be any conductive part that is connected to the processor of Phone B (such as the antenna, or camera cover, for example). It can be noticed that none of both side of the capacitor formed by the two devices need to be made of a touch sensor. Any suitable conductive part can be used, as long as it has the correct connection to the device's processor to treat the data sent or received. For example, referring now also to FIG. 11, there is shown a diagram of the two devices 110, 120 where capacitive coupling between a full 'touch foil+GND' (touchscreen foil plus ground) on one side and a 'conductive part+GND' (conductive part 193 plus ground 191) of the other device. For example, in this embodiment the area(s) of the touchscreen represented by cross-hatching 185 is the area configured for capacitive coupling. Additionally, in some embodiments, even a connection between two existing cellular (or BT [Bluetooth], GPS [global positioning system], NFC [near field communication]) antennas of a mobile device could be used, as long as appropriate software to treat the received data is flashed into both phones. Cellular antennas are connected to the main phone processors of the phone.

Figure 12:
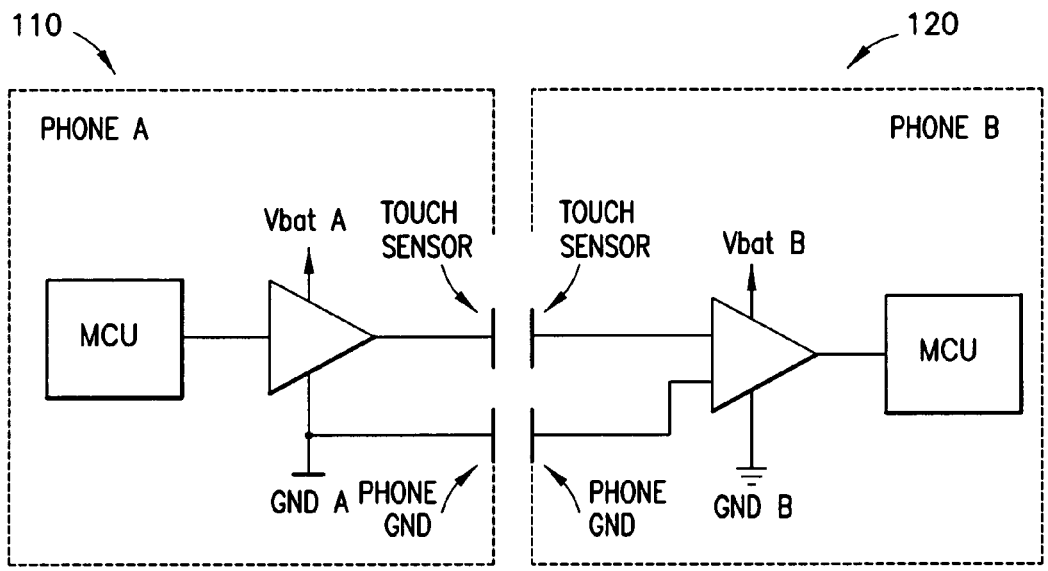
FIG. 12 is a schematic diagram of exemplary devices with capacitive coupling areas and device ground suitable for use in practicing various exemplary embodiments.
Figure 13:
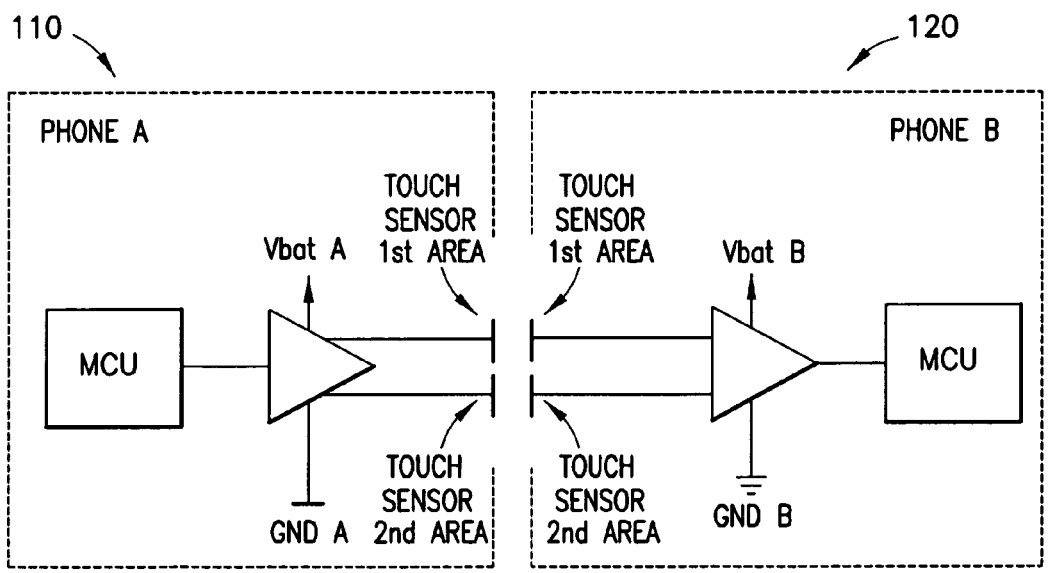
FIG. 13 is a schematic diagram of exemplary devices with capacitive coupling areas suitable for use in practicing various exemplary embodiments.
Figure 14:
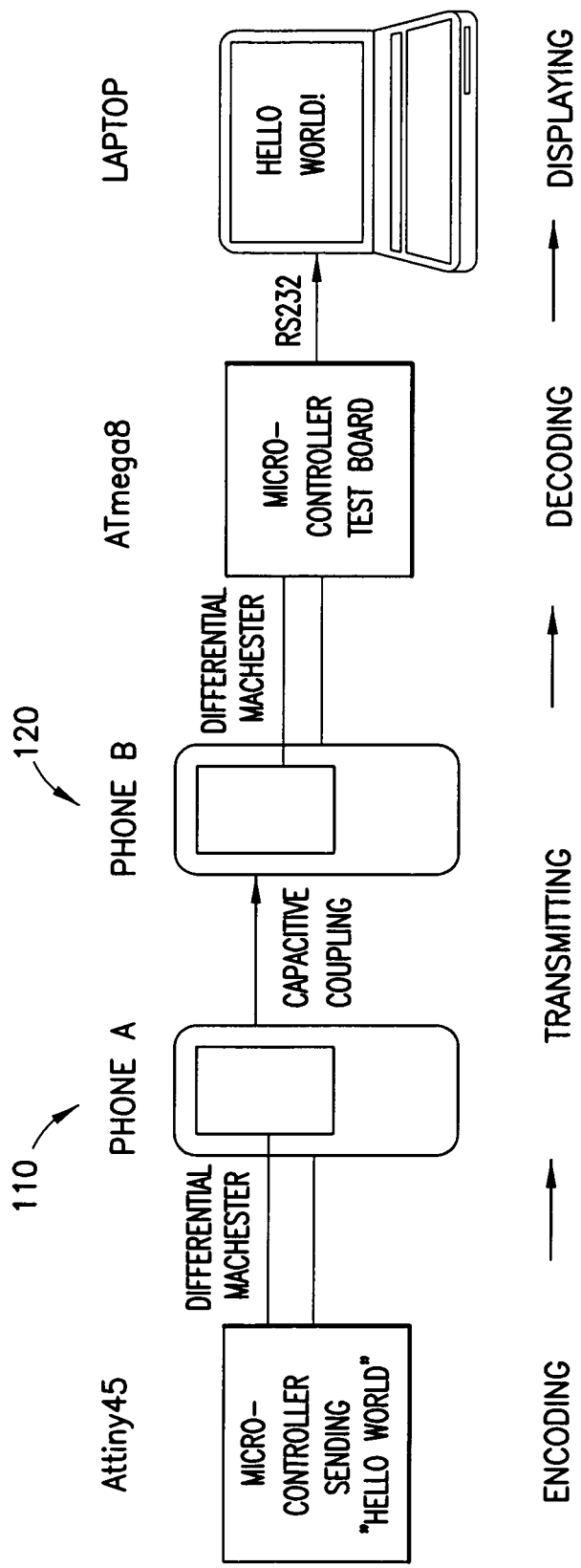
FIG. 14 shows a drawing of an exemplary test configuration in accordance with various exemplary embodiments.

It should be understood that any suitable type circuit configuration may be provided for the capacitive data transfer configurations of device 110, 120. For example, referring now also to FIGS. 12, 13, there are shown exemplary circuit diagrams of the two devices 110, 120. FIG. 12 illustrates configurations where an area of the touchscreen sensor and device ground are used to transfer data between the two devices. FIG. 13 illustrates configurations where two areas of the touchscreen sensor are used to transfer data between the two devices.

According to one example of the invention, a 'test' style configuration may be provided. For example, and referring now also to FIG. 14, there is shown a concept test set up used for the capacitive coupling mode of device 110, 120 to transfer data. In this embodiment, one microcontroller (ATtiny45), emitting the letters "Hello world!" is connected to a resistive touch panel (which may include any suitable dimensions, such as 50 mm*38 mm, for example) and placed on a C3-01 Nokia phone. A second (receiver) microcontroller (ATmega8) is placed on a test board. The connections between the two phones are similar to the diagram shown in FIG. 12, which may provide a voltage swing of about 4Vpp (square waves signals). The test board is connected to a monitor in order to display what is received from the microcontroller Atmega8. When the touch panels are not facing each other, the data receive from ATmega8 is 'noise'. When the two touch panels are facing each other (within less than about 6 mm distance, for example), allowing a good capacitive coupling, the "Hello world!" letters are well received. According to some embodiments of the invention, the whole area of the touch sensor was used as well as the phone cover GND (such as the configuration shown in FIG. 10, for example) to form the capacitors. According to some embodiments, differential Manchester code was used to transfer data and clock. Additionally, the symbol rate can be about 100 kbaud (equals 50 kbit/s for Manchester encoding).

While various exemplary embodiments of the invention have been described above in connection with two mobile phones, one skilled in the art will appreciate that the various exemplary embodiments of the invention are not necessarily so limited and that embodiments of the invention generally relate to near field data transferring using the touchscreen sensor (or the like) based on the capacitive coupling between two separate parts/devices. For example, according to some embodiments of the invention, the devices 110, 120 may include a tablet device and a carry case that can interface to the tablet device contained within the carry case, wherein a cover of the carry case includes a surface for displaying content from the tablet device. It should be understood that although various exemplary embodiments of the invention are described in connection with a tablet device, one skilled in the art would understand that a tablet device configuration is not required and any suitable device that can utilize a carry case, wherein a cover of the carry case includes a surface for displaying content from the main device it encloses may be provided.

Referring now also to FIGS. 15 and 16, there is shown an exemplary embodiment wherein the device 110 comprises a tablet device and wherein the device 120 comprises a carry case for the tablet device. According to this embodiment, when the user takes the tablet out from cover (or carry case), the cover can provide a docking stand function, such as by providing a slot (or groove) 470 suitably sized and shaped to receive an edge of the tablet 110. In the front of the cover 472, there is an adaptive display area 474 on the protective cover to allow the user to have a user interface on the cover 120 which may be configured for typing, reading, drawing and other inputs methods, for example. According to some embodiments of the invention the display area 474 is substantially the same as the display 138 (and display module 140), however, it should be noted that the user interface area on the cover is not required to include a full display (or display module), and any suitable configuration that can support multiple input methods could be provided at the cover.

Figure 17:
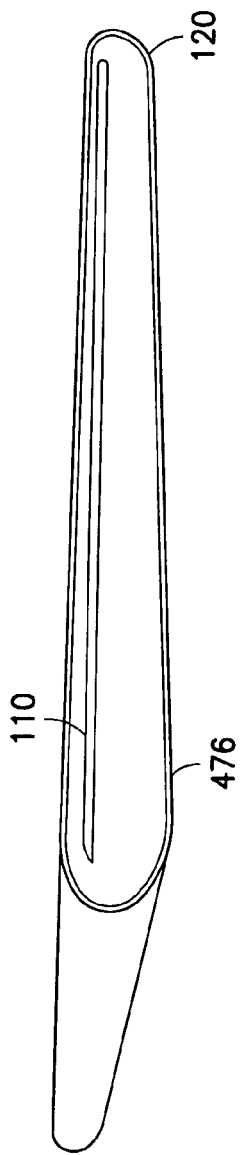

According to some embodiments of the invention, the tablet cover 120 protects the device 110 and is touch enabled. In the protective mode (such as when the tablet device is inside the sleeve portion 476 of the cover as shown in FIG. 17) the protective cover can display content received from the tablet device to show to the user, and the content is transferred using near field emissions (such as capacitive coupling between the tablet device and the cover), and hence no separate radio protocol is needed for communication between the tablet device and the cover.

Figure 18:
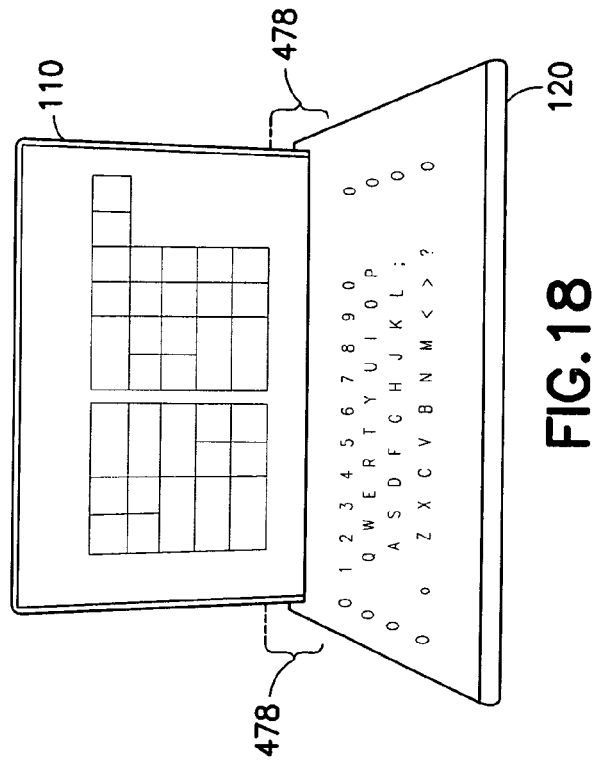
Figure 19:
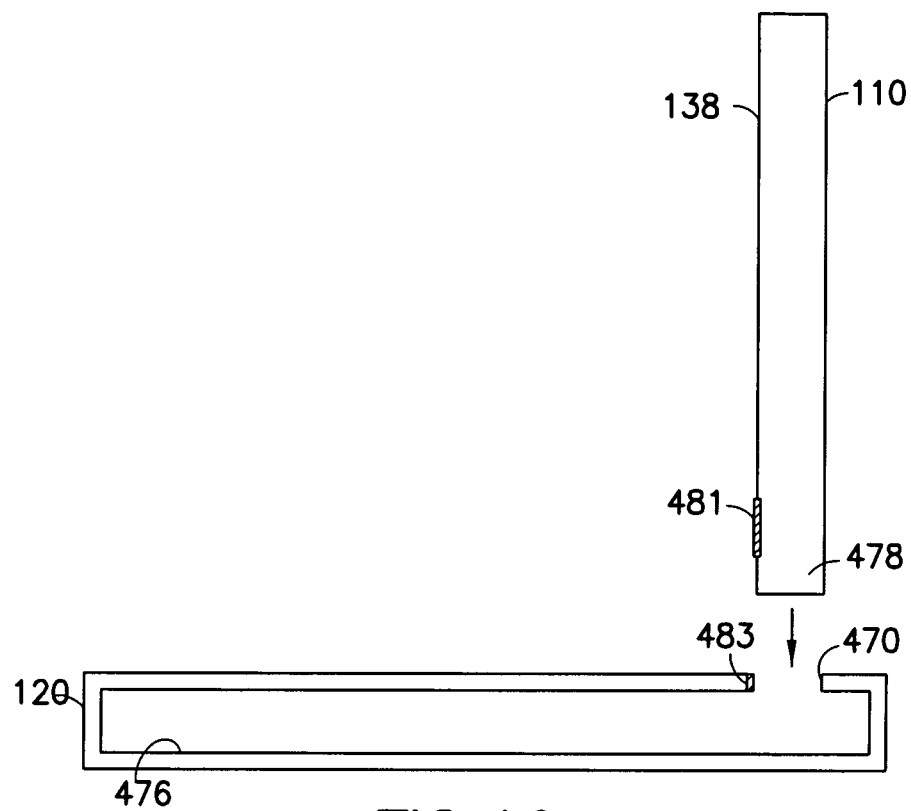
FIGS. 19-20 show sections views of the table and carry case/cover shown in FIGS. 15-18 in 'undocked' and 'docked' configurations.
Figure 20:
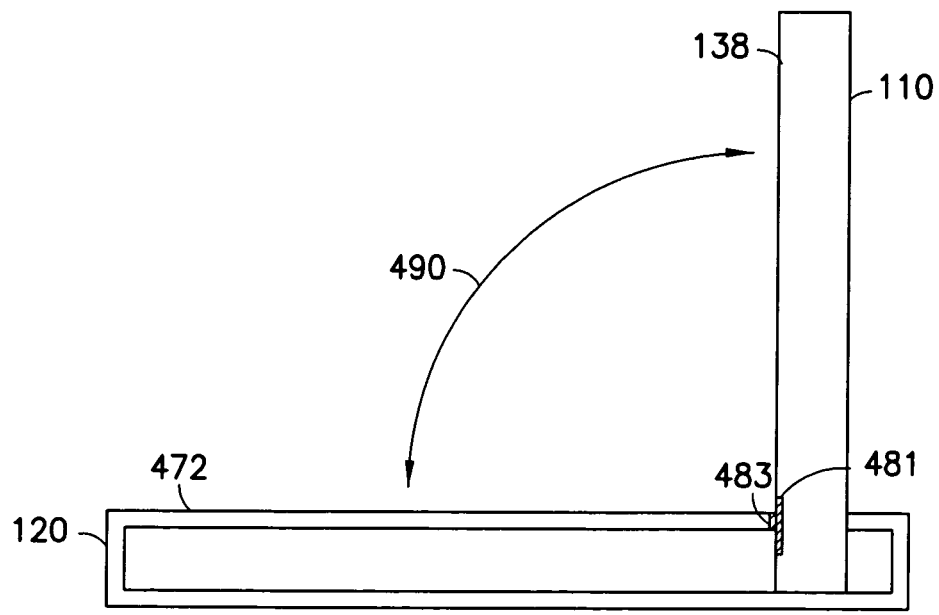
Figure 23:
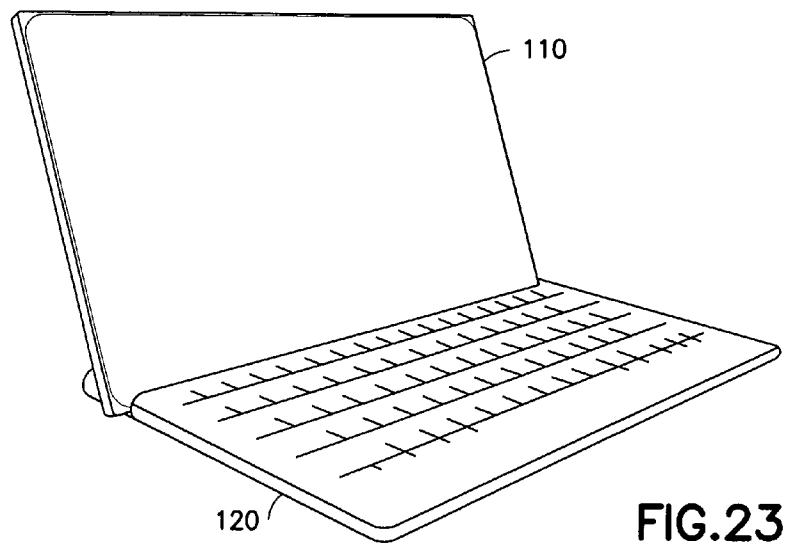
Figure 24:
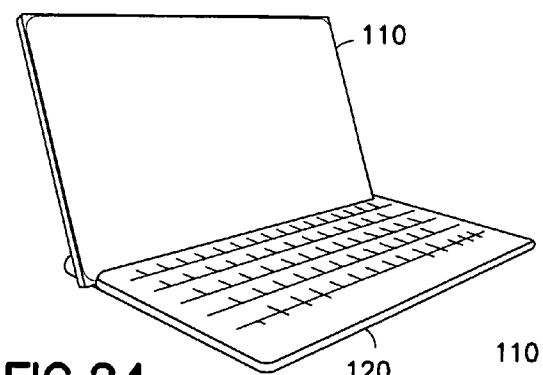
Figure 25:
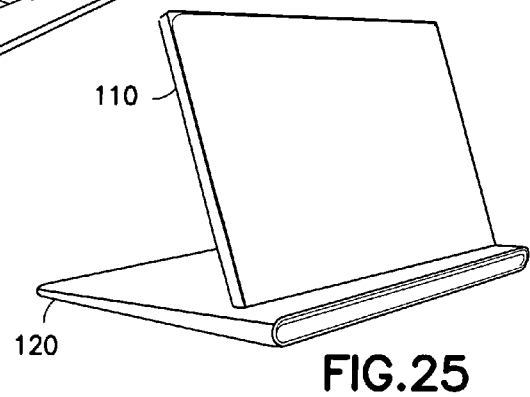

According to some other embodiments of the invention, the cover acts as a stand (as shown in FIGS. 16, 18). In this docking stand mode, the lower edge 478 of the tablet is disabled (such as at a portion proximate the lower edge of the tablet) and is used solely for communicating between the tablet and the cover so the user may use the cover to act as a keyboard. In this mode, the remainder of the tablet may be used as a traditional touch device. The edge of the tablet and the edge of the cover that interact allow communication using near field emissions (such as capacitive coupling, for example) based on the close proximity of the tablet device and the cover. For example, as shown in FIGS. 19-20 (wherein FIG. 19 shows the tablet before it is inserted into the groove 470, and FIG. 20 shows the tablet inserted into the groove 470 in the 'docked' position), the tablet 110 comprises an area 481 (represented by cross-hatching) configured for capacitive coupling, and the cover 120 comprises an area 483 (represented by cross-hatching) configured for capacitive coupling (wherein the cross-hatched areas 481, 483 are similar to the cross-hatched areas 181, 183). Additionally, according to some embodiments of the invention, the device may include a resistive touch screen where there are two electrodes and one of these runs along the length of the touch panel to provide for edge communication between the devices. Furthermore, it should be noted that although FIG. 20 shows the tablet inserted into the groove 470 (in the 'docked' position) at substantially a right angle, alternate embodiments may comprise any suitable angle between the tablet 110 and the cover 120 (see angle 490 shown in FIG. 20), such as an angle of 75 degrees, 100 degrees, or any other suitable angle, for example.

Referring now also to FIGS. 21-27, various exemplary embodiments of the tablet and cover configurations are shown. According to the various embodiments, the sleeve portion (or groove portion) of the cover does not require any specific physical 'snap' or hook (or any other specific attachment), such that any tablet with similar X,Y,Z dimensions can be squeezed (or fitted) into the sleeve portion (or groove portion) for protection, wherein the soft material can grab and hold device inside the sleeve portion safely. Additionally, as shown in FIGS. 21-27, the carry case (or cover) may be configured to allow for the tablet to slide in different angles for different viewing/use angles, such as watching videos for example.

Figure 28:
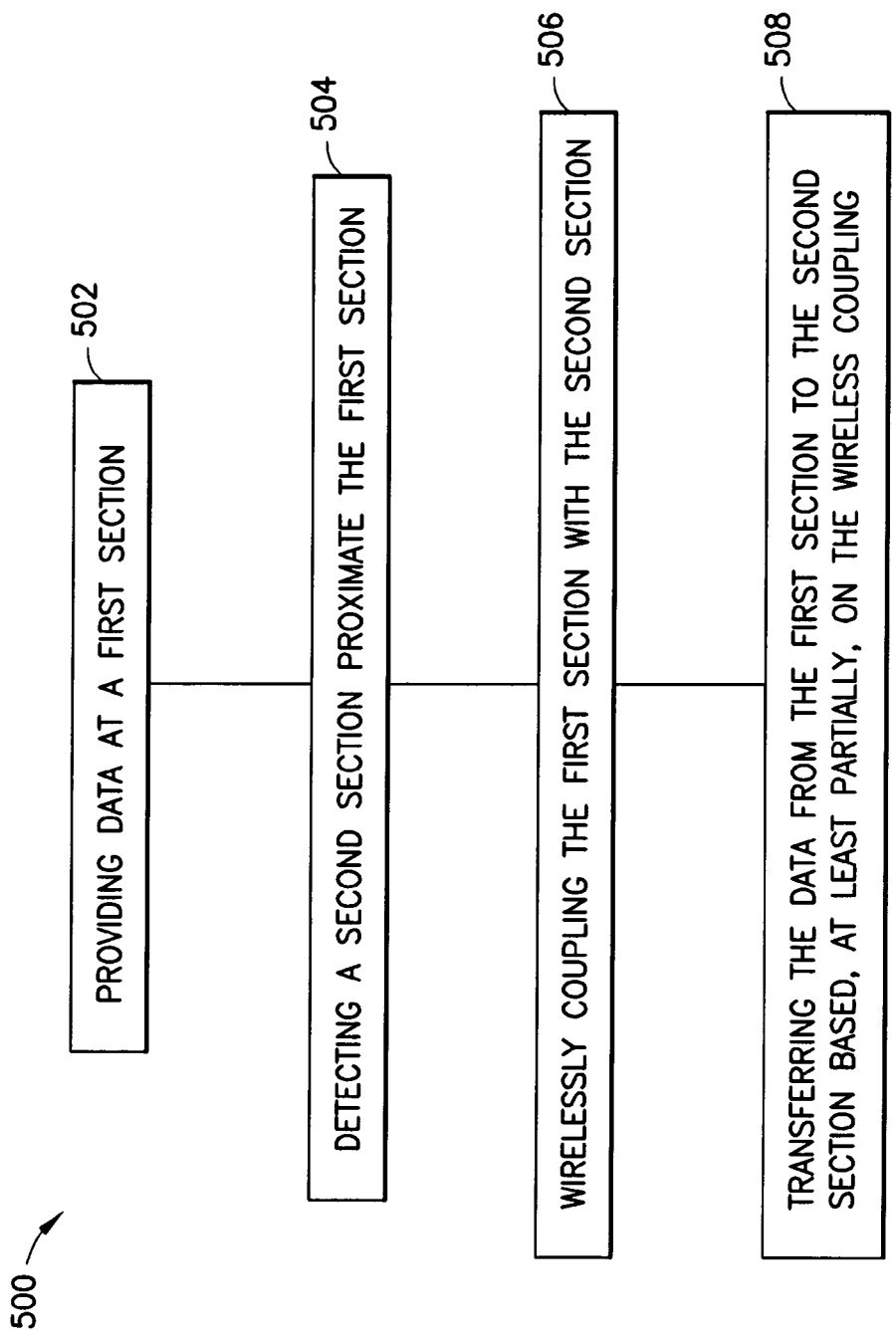
FIG. 28 is a block diagram illustrating an exemplary method in accordance with various exemplary embodiments.

FIG. 28 illustrates a method 500. The method 500 includes providing data at a first section (at block 502). Detecting a second section proximate the first section (at block 504). Wirelessly coupling the first section with the second section (at block 506). Transferring the data from the first section to the second section based, at least partially, on the wireless coupling, wherein at least one of the first and the second sections comprises a transmitting feature and/or a receiving feature (at block 508). It should be noted that the illustration of a particular order of the blocks does not necessarily imply that there is a required or preferred order for the blocks and the order and arrangement of the blocks may be varied. Furthermore it may be possible for some blocks to be omitted.

While various exemplary embodiments of the invention have been described in connection with near field interaction, one skilled in the art will appreciate that near field interaction could include any suitable near field interaction such as electrical, magnetic, mechanical, optical, or acoustic, for example.

Without in any way limiting the scope, interpretation, or application of the claims appearing below, a technical effect of one or more of the example embodiments disclosed herein is providing for an improved method of data transfer where there is no need for any complicated handshake protocol or expensive hardware. Another technical effect of one or more of the example embodiments disclosed herein is easy data sharing, with no additional hardware needed (using existing widely available touch sensor). Another technical effect of one or more of the example embodiments disclosed herein is that data transfer can use any non-grounded metal part between the two devices (such as, not limited to the touch sensor, for example).

Technical effects of any one or more of the exemplary embodiments provide improved data transfer between devices when compared to conventional configurations. For example, various embodiments of the invention provide for simultaneous communication between the two devices 110, 120. In conventional solutions, such as any of other wireless communications such as Bluetooth, for example, such simultaneous data transfer is not possible. Whereas according to various exemplary embodiments of the invention, device 110 is sending a data to device 120 and at the same time device 120 is sending a second data to device 110.

Technical effects of any one or more of the exemplary embodiments provide an improved device and carry case configuration when compared to conventional configurations. For example, various exemplary embodiments provide for configurations which can communicate and utilize the device at the same time. Additionally, in some conventional configurations the tablet and smart cover are connected through a docking connector, such as having a female side on the tablet, and a male side on the cradle of the smart cover, wherein date, power signal, are transmitted through Flex (such as single-directional spring loaded "pop-up" mechanisms, snap-action-spring type mechanisms, or frictional slider solutions, for example). However, various exemplary embodiments of the invention, include a wireless data transfer connection (such as by capacitive coupling) between tablet and cover.

It should be understood that components of the invention can be operationally coupled or connected and that any number or combination of intervening elements can exist (including no intervening elements). The connections can be direct or indirect and additionally there can merely be a functional relationship between components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Below are provided further descriptions of various non-limiting, exemplary embodiments. The below-described exemplary embodiments are separately numbered for clarity and identification. Various aspects of one or more exemplary embodiments may be practiced in conjunction with one or more other aspects or exemplary embodiments. That is, the exemplary embodiments of the invention, such as those described immediately below, may be implemented, practiced or utilized in any combination (for example, any combination that is suitable, practicable and/or feasible) and are not limited only to those combinations described herein and/or included in the appended claims.

In one exemplary embodiment, a method comprising: providing data at a first section; detecting a second section proximate the first section; wirelessly coupling the first section with the second section; and transferring the data from the first section to the second section based, at least partially, on the wireless coupling, wherein at least one of the first and the second sections comprises a transmitting feature and/or a receiving feature.

A method as above, wherein wirelessly coupling further comprises capacitively coupling or inductively coupling.

A method as above, wherein the first section comprises a first user interface and wherein the second section comprises a second different user interface.

A method as above, wherein the transferring of the data is initiated automatically after the second section is detected.

A method as above, wherein the transfer of the data is initiated automatically based on, at least partially, covering a proximity sensor or sensing a vibration module.

A method as above, wherein the first section is a user interface of a first electronic device, and wherein the second section is a user interface of a second electronic device, and wherein the first and second devices are paired devices.

A method as above, wherein the first section is a user interface of a first mobile phone, and wherein the second section is a user interface of a second mobile phone.

A method as above, wherein the first section is user interface of a tablet device, and wherein the second section is a user interface of a carry case for the tablet device.

In another exemplary embodiment, an apparatus comprising: at least one processor; and at least one memory including computer program code, the at least one memory and the computer program code configured to, with the at least one processor, cause the apparatus to perform at least the following: provide data at a first user interface; detect a second user interface proximate the first user interface; wirelessly couple the first user interface with the second user interface; and transfer the data from the first user interface to the second user interface, wherein the first user interface comprises a transmitting feature and/or a receiving feature.

An apparatus as above, wherein the apparatus is configured to capacitively couple the first user interface with the second user interface at one or more dedicated areas of the user interfaces, and wherein the user interfaces each comprise a touch interface, a display, or a portion of a device cover.

An apparatus as above, wherein the apparatus is configured to capacitively couple the first user interface with the second user interface at a portion of the touchscreen and a device ground.

An apparatus as above, wherein the apparatus further comprises a proximity sensor.

An apparatus as above, wherein the apparatus further comprises a touchscreen sensor.

An apparatus as above, wherein the apparatus comprises an electronic device, and wherein the electronic device is configured to capacitively couple with another different electronic device.

An apparatus as above, wherein the apparatus comprises an electronic device, and wherein the electronic device is configured to capacitively couple with a carry case of the electronic device.

In another exemplary embodiment, a non-transitory program storage device readable by a machine, tangibly embodying a program of instructions executable by the machine for performing operations, the operations comprising: providing data at a first user interface; detecting a second user interface proximate the first user interface; coupling the first user interface with the touch user interface; and transferring the data from the first user interface to the second user interface, wherein the first user interface comprises a transmitting feature and/or a receiving feature.

A non-transitory program storage device as above, wherein wirelessly coupling further comprises capacitively coupling or inductively coupling.

A non-transitory program storage device as above, wherein the transferring of the data is initiated automatically after the second user interface is detected.

A non-transitory program storage device as above, wherein the first user interface is touchscreen of a first electronic device, and wherein the second user interface is a touchscreen of a second electronic device.

A non-transitory program storage device as above, wherein the first user interface is touchscreen of a tablet device, and wherein the second user interface is a touchscreen of a carry case for the tablet device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   providing data at a first section;
   detecting a second section proximate the first section;
   wirelessly coupling the first section with the second section; and
   transferring the data from the first section to the second section based, at least partially, on the wireless coupling, wherein at least one of the first and the second sections comprises a transmitting feature and/or a receiving feature;
   wherein the wirelessly coupling of the first section with the second section comprises capacitively coupling the first section with the second section at a portion of a touchscreen and a device ground.

2. The method of claim 1 wherein the first section comprises a first user interface and wherein the second section comprises a second different user interface.

3. The method of claim 1 wherein the transferring of the data is initiated automatically after the second section is detected.

4. The method of claim 3 wherein the transfer of the data is initiated automatically based on, at least partially, covering a proximity sensor or sensing a vibration module.

5. The method of claim 1 wherein the first section is a user interface of a first electronic device, and wherein the second section is a user interface of a second electronic device, and wherein the first and second devices are paired devices.

6. The method of claim 1 wherein the first section is a user interface of a first mobile phone, and wherein the second section is a user interface of a second mobile phone.

7. The method of claim 1 wherein the first section is user interface of a tablet device, and wherein the second section is a user interface of a carry case for the tablet device.

8. An apparatus, comprising:
   at least one processor; and
   at least one memory including computer program code the at least one memory and the computer program code configured to, with the at least one processor, cause the apparatus to perform at least the following:
   provide data at a first user interface;
   detect a second user interface proximate the first user interface;
   wirelessly couple the first user interface with the second user interface; and
   transfer the data from the first user interface to the second user interface, wherein the first user interface comprises a transmitting feature and/or a receiving feature;
   wherein the apparatus is configured to capacitively couple the first user interface with the second user interface at a portion of a touchscreen and a device ground.

9. The apparatus of claim 8 wherein the apparatus is configured to capacitively couple the first user interface with the second user interface at one or more dedicated areas of the user interfaces, and wherein the user interfaces each comprise a touch interface, a display, or a portion of a device cover.

10. The apparatus of claim wherein the apparatus further comprises a proximity sensor.

11. The apparatus of claim 8 wherein the apparatus further comprises a touchscreen sensor.

12. The apparatus of claim 8 wherein the apparatus comprises an electronic device, and wherein the electronic device is configured to capacitively couple with another different electronic device.

13. The apparatus of claim 8 wherein the apparatus comprises an electronic device, and wherein the electronic device is configured to capacitively couple with a carry case of the electronic device.

14. A non-transitory program storage device readable by a machine, tangibly embodying a program of instructions executable by the machine for performing operations, the operations comprising:
   providing data at a first user interface;
   detecting a second user interface proximate the first user interface;

coupling the first user interface with the second user interface; and transferring the data from the first user interface to the second user interface, wherein the first user interface comprises a transmitting feature and/or a receiving feature;

wherein the coupling of the first user interface with the second user interface comprises capacitively coupling the first user interface with the second user interface at a portion of a touchscreen and a device ground.

15. The non-transitory program storage device of claim 14 wherein the transferring of the data is initiated automatically after the second user interface is detected.

16. The non-transitory program storage device of claim 14 wherein the first user interface is touchscreen of a first electronic device, and wherein the second user interface is a touchscreen of a second electronic device.

17. The non-transitory program storage device of claim 14 wherein the first user interface is touchscreen of a tablet device, and wherein the second user interface is a touchscreen of a carry case for the tablet device.

\* \* \* \* \*

UNITED STATES PATENT AND TRADEMARK OFFICE
CERTIFICATE OF CORRECTION

PATENT NO. : 9,325,380 B2
APPLICATION NO. : 13/729414
DATED : April 26, 2016
INVENTOR(S) : Lars Cieslak et al.

It is certified that error appears in the above-identified patent and that said Letters Patent is hereby corrected as shown below:

In Claim 10:

Column 14, line 49, "claim" should be deleted and --claim 8-- should be inserted.

Signed and Sealed this
Fifth Day of July, 2016

Michelle K. Lee
*Director of the United States Patent and Trademark Office*